US012296335B2

(12) United States Patent
Kainz et al.

(10) Patent No.: US 12,296,335 B2
(45) Date of Patent: May 13, 2025

(54) APPARATUS AND METHOD FOR DIRECTING A LIQUID THROUGH A POROUS MEDIUM

(71) Applicant: Hahn-Schickard-Gesellschaft fuer angewandte Forschung e.V., Villingen-Schwenningen (DE)

(72) Inventors: Daniel Kainz, Freiburg im Breisgau (DE); Nils Paust, Freiburg im Breisgau (DE); Yunpeng Zhao, Pfaffenweiler (DE); Susanna Früh, Freiburg im Breisgau (DE)

(73) Assignee: Hahn-Schickard-Gesellschaft fuer angewandte Forschung e.V., Villingen-Schwenningen (DE)

( * ) Notice: Subject to any disclaimer, the term of this patent is extended or adjusted under 35 U.S.C. 154(b) by 1048 days.

(21) Appl. No.: 17/164,203

(22) Filed: Feb. 1, 2021

(65) Prior Publication Data
US 2021/0154662 A1    May 27, 2021

Related U.S. Application Data

(63) Continuation of application No. PCT/EP2019/070530, filed on Jul. 30, 2019.

(30) Foreign Application Priority Data

Aug. 2, 2018  (DE) .................... 10 2018 212 930.4

(51) Int. Cl.
*B01L 3/00* (2006.01)
*G01N 33/53* (2006.01)

(52) U.S. Cl.
CPC ..... *B01L 3/50273* (2013.01); *B01L 3/502715* (2013.01); *B01L 2300/0803* (2013.01); *B01L 2400/0409* (2013.01); *B01L 2400/086* (2013.01)

(58) Field of Classification Search
None
See application file for complete search history.

(56) References Cited

U.S. PATENT DOCUMENTS 6,465,225 B1 * 10/2002 Fuhr .................. B03C 5/026
                                                          210/695
2001/0048895 A1   12/2001 Virtanen
                (Continued)

FOREIGN PATENT DOCUMENTS

CN    101578520 A    10/2007
CN    105939784 A    9/2016
                (Continued)

OTHER PUBLICATIONS

International Preliminary Report on Patentability of PCT/EP2019/070530 dated Jun. 10, 2021, 7 pages.
(Continued)

*Primary Examiner* — Neil N Turk
(74) *Attorney, Agent, or Firm* — Perkins Coie LLP; Michael A. Glenn

(57) ABSTRACT

An apparatus for directing a liquid through a porous medium includes a fluidic module rotatable about a center of rotation and including a fluid chamber and an inflow structure. A porous medium is disposed in the fluid chamber to allow centrifugal force-effected flow of the liquid impinging on a radially inner portion of the porous medium, to a radially outer portion of the porous medium. The porous medium is laterally at least partially spaced apart from chamber walls of the fluid chamber with respect to the flow, so that a fluid connection exists between the radially inner portion of the porous medium and the radially outer portion of the porous medium outside the porous medium. The inflow structure is configured to limit a centrifugal force-effected inflow of the liquid to the radially inner portion of the porous medium to
(Continued)

a first flow rate, wherein a ratio of the first flow rate to a maximum possible flow rate through the porous medium is not greater than two.

19 Claims, 8 Drawing Sheets

(56) References Cited

U.S. PATENT DOCUMENTS

| | | | |
|---|---|---|---|
| 2002/0106786 A1 | 8/2002 | Carvalho et al. | |
| 2002/0137218 A1* | 9/2002 | Mian | B01F 35/71805 436/45 |
| 2003/0053934 A1 | 3/2003 | Andersson et al. | |
| 2004/0129678 A1* | 7/2004 | Crowley | B01L 3/502753 216/84 |
| 2005/0277195 A1 | 12/2005 | Holmquist et al. | |
| 2007/0054270 A1 | 3/2007 | Inganas et al. | |
| 2008/0248499 A1 | 10/2008 | Chiu et al. | |
| 2009/0298191 A1 | 12/2009 | Whitesides et al. | |
| 2010/0297659 A1* | 11/2010 | Yoo | G01N 33/5302 435/6.16 |
| 2012/0301893 A1* | 11/2012 | Siciliano | G01N 33/02 435/7.1 |
| 2014/0017795 A1* | 1/2014 | Kim | G01N 21/17 436/55 |
| 2014/0190903 A1 | 7/2014 | Huang | |
| 2014/0220673 A1 | 8/2014 | Chiu et al. | |
| 2016/0214104 A1 | 7/2016 | Schwemmer et al. | |

FOREIGN PATENT DOCUMENTS

| | | |
|---|---|---|
| CN | 105964313 A | 9/2016 |
| WO | 2002041997 A1 | 5/2002 |
| WO | 2009039239 A2 | 3/2009 |
| WO | 2017186063 A1 | 11/2017 |

OTHER PUBLICATIONS

First Office Action of Chinese Application No. 201980063921.3, issued Jan. 26, 2022 (12 pages)(with English translation).

Bahrami, M., et al., "Pressure Drop of Fully-Developed, Laminar Flow in Microchannels of Arbitray Cross-Section", Transactions of the ASME, vol. 128, Sep. 2006, 1036-1044, Sep. 2006, pp. 1036-1044.

Bruus, H., "Theoretical Microfluidics", 2008, Oxford University Press, Oxford, vol. 18, Kapitel 4, Hydraulic resistance and compliance, 71-90, 2008, pp. 71-90.

Ducrée, Jens, et al., "The centrifugal microfluidic Bio-Disk platform", Journal of Micromechanics and Microengineering 17.7, 2007, 103-115, 2007, pp. 103-115.

Hwang, Hyundoo, et al., "Paper on a disc: balancing the capillary-driven flow with a centrifugal force", Lab Chip, 2011, 3404-3406, Jul. 29, 2011, pp. 3404-3406.

Lutz, Sascha, et al., "A fully integrated microfluidic platform for highly sensitive analysis of immunochemical parameters", Analyst, 2017, 142, 4206-4214, 2017, pp. 4206-4214.

Richter, M., et al., "Microchannels for applications in liquid dosing and flow-rate measurement", Sensors and Actuators A: Physical, 1997, vol. 62, Ausgabe 1-3, 480-483, 1997, pp. 480-483.

Schwarz, I., et al., "System-level network simulation for robust centrifugal-microfluidic labon—a-chip systems", Lab Chip, 2016, 16, 1873-1885, 2016, pp. 1873-1885.

Vulto, Paul, et al., "Phaseguides: a paradigm shift in microfluidic priming and emptying", Lab on a Chip, (Jan. 1, 2011), vol. 11, No. 9, doi:10.1039/c0lc00643b, ISSN 1473-0197, p. 1596, XP055091039 [Y] 6-10 * p. 3-7; figures 5, 6 *, Jan. 1, 2011, pp. 3-7.

* cited by examiner

APPARATUS AND METHOD FOR DIRECTING A LIQUID THROUGH A POROUS MEDIUM

CROSS-REFERENCE TO RELATED APPLICATIONS

This application is a continuation of copending International Application No. PCT/EP2019/070530, filed Jul. 30, 2019, which is incorporated herein by reference in its entirety, and additionally claims priority from German Application 10 2018 212 930.4, filed Aug. 2, 2018, which is also incorporated herein by reference in its entirety.

The present disclosure relates to apparatuses and methods for directing a liquid through a porous material and in particular to apparatuses and methods for directing a liquid through a porous material in the field of centrifugal microfluidics with respect to a center or axis of rotation in the radially outward direction using centrifugal force.

BACKGROUND OF THE INVENTION

Centrifugal microfluidics deals with the handling of liquids in the femtoliter to milliliter range in rotating systems. Such systems are usually disposable cartridges, consisting of a polymer, which are used in or instead of centrifuge rotors. Such cartridges are developed with the intention of automating laboratory processes. Standard laboratory processes, such as pipetting, centrifuging, mixing or aliquoting can be implemented in a microfluidic cartridge, which can also be referred to as a fluidic module. For this purpose, the cartridges contain fluidic structures in the form of channels for fluid flow as well as chambers for collecting fluids. By providing the cartridges with a predefined sequence of rotational frequencies, the so-called frequency protocol, the liquids contained in the cartridges can be moved by the centrifugal force.

Centrifugal microfluidics is mainly used in laboratory analysis and mobile diagnostics. The most common cartridge design to date is a centrifugal microfluidic disc, which is used in special processing devices. Such discs are known as "Lab-on-a-disc", "LabDisc" or "Lab-on-CD", among others. Other formats, such as microfluidic centrifuge tubes, can be used in rotors of already existing standard laboratory devices. Such a centrifuge tube is known, for example, under the name "LabTube".

Established tests that are inexpensive to produce for the detection of analytes in an analysis sample that use a porous medium as the solid phase are so-called immunochromatographic rapid tests (lateral flow tests). An example is a pregnancy test using pregnancy test strips. Porous media have a high surface-to-volume ratio and are therefore particularly suitable as a solid phase for surface bonding reactions, such as those that take place on immunochromatographic test strips. The flow through the test strip is determined by the properties of the porous media, which in the case of ordinary test strips may consist of nitrocellulose, and can be slightly regulated by the choice of porous media. Further, the porous media are subject to manufacturing-related variations, so that the flow rates can additionally vary depending on the batch or lot. Thus, the resulting incubation time for the biomolecules reacting in the test strip also varies, which in turn can result in different signals during readout. Therefore, immunochromatographic test strips are usually only qualitative or semi-quantitative. Quantitative immunochromatographic rapid test systems need long development times and may be prone to errors due to quality variations. In addition, only biomolecules having fast reaction kinetics can be used, as incubation times in the test strip are generally short.

For the development of reproducible, highly sensitive and quantitative immunochromatographic rapid tests, the flow should not depend on the intrinsic properties of the porous medium, but should ideally be controllable by an externally adjustable force.

However, integration of an externally adjustable flow control in regular immunochromatographic rapid tests is not possible.

Centrifugal microfluidic platforms can offer the possibility of flow control through a porous medium in this case. In particular, there are two approaches for integrating a porous medium to be flowed through into a centrifugal fluidic module that is rotatable about a center of rotation. A first approach consists of a fluid flow through the porous medium with respect to the center of rotation in a radially outward direction. A second approach consists of a fluid flow through the porous medium with respect to the center of rotation in a radially inward direction.

Structures and methods that allow a liquid to flow through a porous medium in a centrifugal gravity field are already known.

Hyundoo Hwang et al., "*Paper on a disc: balancing the capillary-driven flow with a centrifugal force*", Lab Chip, 2011, 3404-3406, describe an integration concept in which a porous medium is flowed through in a radially inward direction and which is comparable in its mode of operation to immunochromatographic test strips, since the driving force is the capillarity of the porous medium. However, the concept described allows the capillary-driven flow through the porous medium to be slowed down by the centrifugal force counteracting the capillary force. Chromatographic membranes (nitrocellulose) are introduced into rotating discs as the porous medium. The membrane strips are glued into the disc in the radial direction. The sample is loaded at a radially outward position and migrates radially inward due to the capillarity of the porous medium and can now be centrifugally decelerated, stopped or pushed back in the opposite direction. Deceleration can increase the incubation time and potentially provide signal amplification. In addition, the authors derive a physical model to predict the filling level of the membrane in a frequency-dependent manner. This model can be used to calculate the continuous adjustment of the frequency during processing to achieve a constant flow rate through the membranes, wherein here the limiting factor is also the capillarity of the porous medium.

Sascha Lutz et al., "*A fully integrated microfluidic platform for highly sensitive analysis of immunochemical parameters*", Analyst, 2017, 142, 4206-4214, describe a centrifugal fluidic module used to perform a highly sensitive immunoassay. As a porous medium, nitrocellulose is used as the solid phase for the capture antibodies with capillary flow in the radially inward direction. During the assay, the flow rate through the porous medium is constantly decelerated with a rotation at a rotational frequency of 5 Hz. In the described fluidic module, in addition to the membrane functionalized with capture antibodies, a so-called waste fiber web is used to draw washing liquids, which are processed in addition to the sample to be analyzed, also through the nitrocellulose membrane in a capillary manner and absorb them radially inside the membrane.

WO 2009/039239 A2 describes a system for detecting analytes in an analysis sample using a lateral flow unit in a centrifugal gravity field. Liquid is applied directly onto the porous medium. Two different methods are described, the first involving flow through a porous support material radially inward (inward), and the second involving flow through a porous medium radially outward (outward). In the first case, the flow is decelerated by the application of a centrifugal force. In the second case, the capillary-driven flow is centrifugally supported. In both cases, the centrifugal force is considered together with the capillary force.

US 2007/0054270 A1 discloses a microfluidic apparatus comprising one or more microchannel structures. Among other things, a reaction chamber with a bead fill for experiments is described. Here, the reaction chamber retains the beads in such a manner that a homogeneous column of beads is formed. The bead fill fills the entire radially outer part of the reaction chamber. The reaction chamber also provides a physical barrier to prevent liquid from flowing around the outside of the bead fill. Thus, the reaction chamber represents a sealing apparatus. The experiments performed are characterized, for example, by the interaction of the beads as a solid phase with a substance dissolved in a liquid as a surface bonding reaction. With the described apparatus, several experiments can be performed in parallel.

SUMMARY

According to an embodiment, an apparatus for directing a liquid through a porous medium may have: a fluidic module rotatable about a center of rotation and including a fluid chamber and an inflow structure, a porous medium disposed in the fluid chamber to allow centrifugal force-effected flow of the liquid impinging on a radially inner portion of the porous medium to a radially outer portion of the porous medium, wherein the porous medium is laterally at least partially spaced apart from chamber walls of the fluid chamber with respect to the flow, so that a fluid connection exists between the radially inner portion of the porous medium and the radially outer portion of the porous medium outside the porous medium, which represents a bypass for a liquid flow not through the porous medium between the chamber walls and the porous medium, wherein the inflow structure is configured to limit a centrifugal force-effected inflow of the liquid to the radially inner portion of the porous medium to a first flow rate, wherein a ratio of the first flow rate to a maximum possible flow rate through the porous medium is not greater than two.

According to another embodiment, a method for directing a liquid through a porous medium may have the steps of: providing a fluidic module rotatable about a center of rotation, which includes a fluid chamber and an inflow structure, wherein a porous medium is disposed in the fluid chamber to allow a centrifugal force-effected flow of the liquid impinging on a radially inner portion of the porous medium to a radially outer portion of the porous medium, wherein the porous medium is laterally at least partially spaced apart from chamber walls of the fluid chamber with respect to the flow, so that a fluidic connection exists between the radially inner portion of the porous medium and the radially outer portion of the porous medium outside the porous medium, which represents a bypass for a liquid flow not through the porous medium between the chamber walls and the porous medium, wherein the inflow structure is configured to limit centrifugal force-effected inflow of the liquid to the radially inner portion of the porous medium to a first flow rate, and wherein a ratio of the first flow rate to a maximum possible flow rate through the porous medium is not greater than two; and rotating the fluidic module about the center of rotation to cause the inflow of the liquid through the inflow structure to the radially inner portion of the porous medium and to direct the liquid through the porous medium.

Examples of the present disclosure provide an apparatus for directing a liquid through a porous medium, comprising:
a fluidic module rotatable about a center of rotation and comprising a fluid chamber and an inflow structure,
a porous medium disposed in the fluid chamber to allow centrifugal force-effected flow of the liquid impinging on a radially inner portion of the porous medium to a radially outer portion of the porous medium, wherein the porous medium is laterally at least partially spaced apart from chamber walls of the fluid chamber with respect to the flow, so that a fluidic connection exists between the radially inner portion of the porous medium and the radially outer portion of the porous medium outside the porous medium,
wherein the inflow structure is configured to limit a centrifugal force-effected inflow of the liquid to the radially inner portion of the porous medium to a first flow rate, and
wherein a ratio of the first flow rate to a maximum possible flow rate through the porous medium is not greater than two.

Examples of the present disclosure provide a method for directing a liquid through a porous medium, comprising:
providing a fluidic module rotatable about a center of rotation, which comprises a fluid chamber and an inflow structure, wherein a porous medium is disposed in the fluid chamber to allow a centrifugal force-effected flow of the liquid impinging on a radially inner portion of the porous medium to a radially outer portion of the porous medium, wherein the porous medium is laterally at least partially spaced apart from chamber walls of the fluid chamber with respect to the flow, so that a fluidic connection exists between the radially inner portion of the porous medium and the radially outer portion of the porous medium outside the porous medium, wherein the inflow structure is configured to limit a centrifugal force-effected inflow of the liquid to the radially inner portion of the porous medium to a first flow rate, and wherein a ratio of the first flow rate to a maximum possible flow rate through the porous medium is not greater than two; and
rotating the fluidic module about the center of rotation to cause the inflow of the liquid through the inflow structure to the radially inner portion of the porous medium and to direct the liquid through the porous medium.

Examples of the present disclosure are based on the understanding that by skillfully taking advantage of a centrifugal microfluidic system, it is possible to direct a liquid flow through a porous medium in a controlled manner such that at least half of the liquid flow is directed through the porous medium. In examples, the liquid flow can be directed through a porous medium in a controlled manner without flowing around the porous medium. In this case, a fluid chamber in which the porous medium is arranged without complete lateral sealing with respect to the flow, is preceded by an inflow structure which limits the inflow in such a way that the inflow corresponds at most to twice the maximum possible flow rate through the porous medium. This ensures that at least half of the liquid flow impinging on the radially inner portion of the porous medium is directed through the porous medium. Fluidic structures comprising the inflow structure, the fluid chamber and the porous medium may be further configured to cause the ratio of the first flow rate to the maximum possible flow rate through the porous medium to assume smaller values, such as a value of 1 or less, in which case all of the liquid flow may flow through the porous medium.

Examples of the present disclosure are based on the knowledge that the integration of a porous medium into a centrifugal microfluidic platform can be easily combined with other operations on the same centrifugal microfluidic platform. In examples, blood plasma separation followed by aliquoting and subsequent dilution and then mixing with components to perform a subsequent lateral flow immunoassay can be realized with minimum handling effort and exact sample volume. The porous medium is used as a substrate for surface bonding reaction due to its large surface-to-volume ratio.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
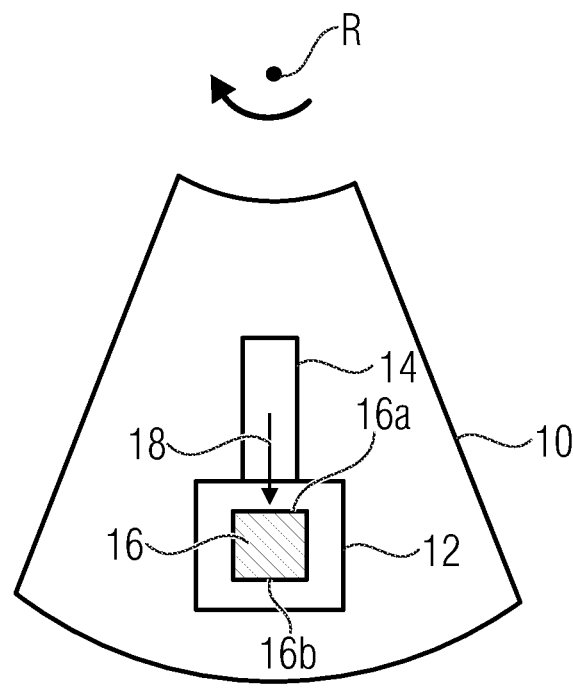
FIG. 1 is a schematic illustration of an example of an apparatus for directing a liquid through a porous medium.

Examples of the present disclosure are described in detail below using the accompanying drawings. It should be noted that the same elements or elements having the same functionality are provided with the same or similar reference numbers, and repeated description of elements provided with the same or similar reference numbers is typically omitted. In particular, the same or similar elements may each be provided with reference numbers having the same number with a different or no lower case letter. Descriptions of elements having the same or similar reference signs are interchangeable. In the following description, many details are described to provide a more thorough explanation of examples of the disclosure. However, it will be apparent to those skilled in the art that other examples may be implemented without these specific details. Features of the various examples described may be combined with each other, unless features of a corresponding combination are mutually exclusive or such combination is expressly excluded.

Before further explaining examples of the present disclosure, definitions of some terms used herein are provided.

Fluidic module: A body in which fluidic structures are formed, which body may be configured as a rotational body or an insert for a rotational body. Examples of a fluidic module are centrifugal cartridges in the form of centrifugal microfluidic discs or microfluidic centrifuge tubes.

Fluidic structures: recesses, cavities and channels formed in a fluidic module and configured to handle liquids. Centrifugal microfluidic structures are configured for handling liquids in the femtoliter to milliliter range in rotating systems.

Hydrostatic height: radial distance between two points in a centrifugal fluidic module (between which there is liquid of a continuous amount of liquid).

Hydrostatic pressure: pressure difference between two points induced by centrifugal force due to the hydrostatic height between them, the density of the medium and the rotational frequency.

Capillarity: behavior of liquids in contact with capillaries, e.g. narrow tubes or in a porous medium. These effects are caused by the surface tension of liquids themselves and the interfacial tension between liquids and the solid surface.

Viscous dissipation: energy lost in the flow of a liquid in the form of thermal energy due to internal shear forces.

Permeability: quantitative parameter for the permeability of a porous medium to gases or liquids.

Immunoassay: a method of bioanalysis that uses the specific antibody-antigen reaction to detect an analyte in a liquid phase.

Incubation time: Time during which a specific reaction can occur, for example, to form the antigen-antibody complex.

Solid phase: Surface of a solid that is used, for example, for a separating adsorption reaction. The surface can be functionalized with substances.

Antibody: a protein that recognizes foreign substances (antigen) and specifically binds to them.

Antigen: foreign substances that are recognized by antibodies and to which antibodies can specifically bind.

Analyte: a component that is present in the analysis sample and that is to be detected.

Bypass: Liquid flow that does not follow the desired fluidic path, for example flow above or next to a porous medium instead of through the porous medium.

Dynamic range: the ratio between the maximum signal still to be differentiated and the minimum signal still to be differentiated (detection limit).

Immunochromatographic rapid test (lateral flow test): a physical-chemical separation method combining thin-layer chromatography and biochemical affinity reactions. A rapid test for the detection of analytes in the form of a test strip, usually consisting of membranes which, due to their capillarity, draw the analysis sample through the test strip.

Radial: when the term radial is used herein, in each case radial is meant with respect to a center of rotation R about which a fluidic module is rotatable. Thus, in the centrifugal field, a radial direction away from the center of rotation is radially outward and a radial direction toward the center of rotation is radially inward. A fluid channel whose beginning is closer to the center of rotation than its end is radially downward, while a fluid channel whose beginning is farther from the center of rotation than its end is radially upward. Thus, a channel comprising a radially rising portion comprises directional components that are radially rising or run radially inward. It is obvious that such a channel does not have to run exactly along a radial line, but can run at an angle to the radial line or curved.

Siphon: as used herein, a siphon refers to a fluid channel that comprises a local radial minimum between a radially rising and a radially falling channel portion.

Examples of the present disclosure relate to a structure as well as a method for processing one or more liquids through a porous medium under centrifugation. The direction of flow is radially outward.

FIG. 1 schematically illustrates an example of an apparatus for directing a liquid through a porous medium, comprising a fluidic module 10 rotatable about a center of rotation or axis of rotation R. The fluidic module 10 comprises a fluid chamber 12 and an inflow structure 14. A porous medium 16 is disposed in the fluid chamber 12. The fluidic module is rotatable about the center of rotation R so that centrifugal force causes a liquid flow 18 through the inflow structure 14 that impinges on a radially inner portion 16a of the porous medium, as indicated by the arrow 18 in FIG. 1. The liquid flow 18 is limited to a first flow rate by the inflow structure. The porous medium 16 is arranged in the fluid chamber 12 such that the liquid flows through the porous medium 16 by centrifugal force from the radially inner portion 16a to a radially outer portion 16b. Lateral edges of the porous medium 16 are spaced apart from chamber walls of the fluid chamber so that a fluidic connection (bypass) exists between a region of the fluid chamber 12 radially inside the porous medium 16 and a region of the fluid chamber 12 radially outside the porous medium 16. According to the present disclosure, the inflow structure limits the first flow rate set with respect to the maximum possible flow rate through the porous medium such that at least 50% of the liquid flows from the portion 16a to the portion 16b through the porous medium.

In examples, the inflow structure comprises at least one flow resistance channel and/or at least one nozzle, and/or at least one porous medium and/or at least one bead fill. In examples, the inflow structure opens into an inflow chamber at a radial distance $r_i$ from a center of rotation and into the fluid chamber at a radial distance $r_2$ from the center of rotation, with $r_i < r_2$. The inflow structure is thus radially falling, so that liquid flow through the inflow structure can be caused by centrifugal force during rotation.

The inflow structure provides a flow resistance to the liquid flow, by which the liquid flow is limited to the first flow rate. The inflow structure thus represents a flow resistance element whose fluid inlet can open into an inflow chamber (cavity) and whose fluid outlet opens into the fluid chamber or is fluidically coupled with the fluid chamber. The inflow chamber may smoothly merge into the flow resistance element or even be part of the resistance element. In examples, the flow resistance element may be formed by a porous medium or bead fill in the inflow chamber. In examples, the flow resistance element may be formed by a nozzle at the outlet of the inflow chamber. In examples, the flow resistance element may be formed by a channel having an inlet opening into the inflow chamber and an outlet opening into the fluid chamber.

For examples, the pressure drop per volume flow can be given for the definition of a resistance element. An element can then count as a resistance element for the fluidic structure if the following applies:

$$R = \frac{\Delta p}{Q} > 3.5 * 10^8 \frac{\text{Pa} * s}{\text{m}^3}$$

with
R: fluidic resistance of the element,
Δp: pressure drop across the element,
Q: flow rate through the element.

When the resistance element is formed by a flow resistance channel, each portion of a fluid structure can be considered as part of a flow resistance channel for whose flow cross-section $A_{Ch}$ the following applies:

$$\frac{1}{A_{Ch}^2} > 100 \frac{1}{\text{mm}^4}$$

In other words, any part of a fluid structure that provides a flow cross-section of less than 0.1 mm² can be considered a component of a flow resistance channel.

As will be explained in detail below, according to the present disclosure, the fluidic structures are formed such that the following equation is satisfied:

$$D = \frac{Q_{Ch}}{Q_{max,m}} \leq 2$$

where $Q_{Ch}$ is the flow rate through the inflow structure, $Q_{max,m}$ is the maximum possible flow through the porous medium, and D is a design factor.

$Q_{max,m}$ can be calculated by Darcy's law and represents the maximum possible flow through the porous medium, at an applied centrifugal pressure, without bypass. Qui is calculated or set experimentally depending on the resistance element used. If the resistance element is a channel or a nozzle, the pressure drop can be calculated analogously to the Hagen-Poiseuille law. Regarding the calculation of the pressure drop, reference can be made, for example, to M. Bahrami et al., "Pressure Drop of Fully-Developed, Laminar Flow in Microchannels of Arbitray Cross-Section," Transactions of the ASME, Vol. 128, September 2006, pages 1036 to 1044; I. Schwarz et al., "System-level network simulation for robust centrifugal-microfluidic lab-on-a-chip systems," Lab Chip, 2016, 16, pages 1873 to 1885; M. Richter et al., "Microchannels for applications in liquid dosing and flow-rate measurement," Sensors and Actuators A: Physical, 1997, Vol. 62, Issue 1-3, pages 480-483; and H. Bruus, "Theoretical Microfluidics" 2008, Oxford University Press, Oxford, Vol. 18, Chapter 4, "Hydraulic resistance and compliance," pages 71-90, whose teachings in this regard are hereby incorporated by reference. The pressure drop can then in turn be used to calculate the flow rate. If the resistance element is a porous medium or bead fill, Darcy's law can be applied.

Since both laws are derived from the Navier-Stokes equations and differ only by parameters that take into account the respective geometry of the element through which the fluid flows, the viscosity of the liquid is truncated when calculating the ratio of the flow rates. Both flows $Q_{Ch}$ and $Q_{max,m}$ are centrifugally driven. Therefore, the angular velocity and density are also truncated when calculating the ratio of the flow rates. Thus, the fluidic structures can be designed independently of the fluid properties and rotational frequency.

If needed, the flow rate through the inflow structure can be calculated using the geometric parameters of the inflow structure, the rotational speed and the fluid properties of the liquid. Alternatively, the flow rate can be measured by detecting the liquid volume that passes through the inflow structure in a given time. The maximum possible flow rate through the porous medium can also be calculated, if needed, using the parameters of the porous medium and the liquid, or can be determined experimentally.

Figure 2:
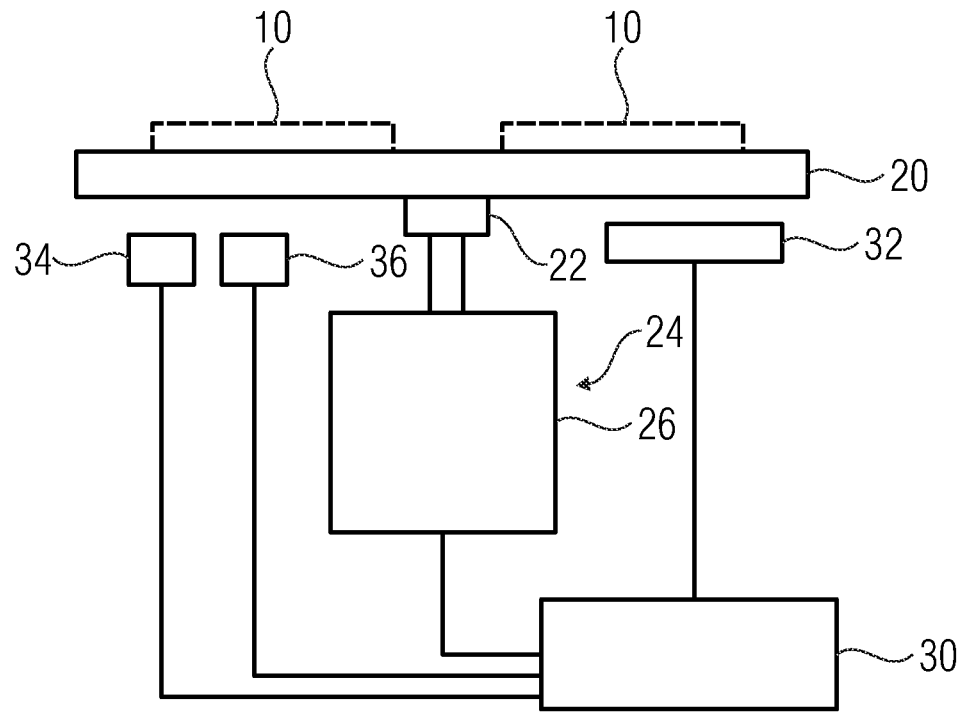
FIG. 2 is a schematic illustration of another example of an apparatus for directing a liquid through a porous medium.

FIG. 2 schematically shows a side view of an example of an apparatus for directing a liquid through a porous medium, which represents a centrifugal microfluidic system. The apparatus comprises a fluidic module 20 formed as a rotational body. Alternatively, the apparatus comprises one or several fluidic modules 10 inserted into a rotational body 20, as indicated in dashed lines in FIG. 2. Fluidic structures as described herein may be formed in the fluidic module 10 or 20. For example, the fluidic module may comprise a substrate and a lid. The rotational body 20 may be circular, with a central opening through which the rotational body 20 may be attached to a rotatable part 22 of a drive apparatus 24 via conventional attachment means. The rotatable part 22 is rotatably mounted to a stationary part 26 of the drive apparatus 24. The drive apparatus 24 may be, for example, a conventional centrifuge that may comprise an adjustable rotational speed, or it may be a CD or DVD drive. Control means 30 may be provided, which are configured to control the drive apparatus 24 to provide the rotational body 20 with a rotation or rotations of different rotational frequencies. As will be apparent to those skilled in the art, the control means 30 may be implemented, for example, by an appropriately programmed computing means or a user-specific integrated circuit. The control means 30 may further be configured to control, in response to manual input from a user, the drive apparatus 24 to effect the needed rotations of the rotational body. In any case, the control means 30 may be configured to control the drive apparatus 24 to provide the rotational body with the needed rotations to implement examples of the present disclosure. The drive apparatus 24 may be a conventional centrifuge with only one direction of rotation.

The fluidic module 10 or 20 comprises fluidic structures described herein, which may be formed by cavities and channels in the lid, the substrate, or in the substrate and the lid. For example, in examples, fluidic structures may be formed in the substrate while filling ports and vents are formed in the lid. In examples, the structured substrate (including filling openings and vents) is disposed at the top and the lid is disposed at the bottom.

In examples of the present disclosure, the fluidic module may be formed of any suitable material, such as a plastic, such as PMMA (polymethyl methacrylate), PC (polycarbonate), PVC (polyvinyl chloride) or PDMS (polydimethylsiloxane), glass, or the like. The rotational body 20 may be considered a centrifugal microfluidic platform. In examples, the fluidic module or rotational body may be formed from a thermoplastic, such as PP (polypropylene), PC, COP (cyclic olefin polymer), COC (cyclo olefin copolymer), or PS (polystyrene).

In examples, the apparatus may further comprise temperature control means 32 configured to control the temperature of the fluidic module. The temperature control means 32 may be implemented as external heating means, as shown in FIG. 2. Alternatively, the heating means may be integrated into the fluidic module or the rotational body supporting the fluidic module. In examples, the apparatus may further comprise detecting means 34 configured to detect a result of a reaction of the liquid with the porous medium. For example, the detecting means 34 may be configured to optically detect the result of the reaction. For example, the detecting means may be implemented by a camera. In examples, the apparatus may further comprise means 36 for detecting information about the viscosity of the liquid. In examples, the means 36 may be configured to measure a flow rate through the inflow structure, which in turn is a measure of viscosity at a given rotational speed. For example, the means 36 may be configured to determine the amount of liquid that has flowed through the inflow structure in a given time. In examples, the means 36 may be formed by a camera. In examples, the apparatus may be configured to adjust the rotational speed of the rotation depending on the detected viscosity information to adjust the flow rate through the inflow channel to a predetermined flow rate. As shown in FIG. 2, the temperature control means 22 and means 34 and 36 may be communicatively coupled to the control means by wire or wirelessly. The control means 30 may be configured to receive the detection results of means 34 and 36, output or display information about the reaction result based on the results of means 34, and control the drive means 24 based on the results of means 36. Further, the control means may control the temperature control means 32 to control or regulate the temperature of the fluidic module to a predetermined temperature. To this end, a temperature sensor for sensing the temperature of the fluidic module may further be coupled to the control means 30.

In the following, examples of the present disclosure are described with particular reference to a flow resistance channel as an inflow structure. The following teachings are equally applicable to other resistance elements.

In examples, liquid is driven centrifugally from a first chamber through a flow resistance channel onto a porous medium in a second chamber. The liquid wets the porous medium, for example a membrane. The membrane is filled with liquid and centrifugal pressure is created in the liquid in the membrane. Below a critical filling level, capillary force holds the liquid in the membrane. Above a critical filling level, or completely filled if needed, liquid exits the membrane radially outward. In this case, the flow rate through the flow resistance channel is adjusted in such a way that flow of the liquid above or next to the porous medium takes place only up to a certain extent or not at all.

Thus, provided that the liquid wets the porous medium, a flow through a porous medium that is independent of capillary force and can be well controlled can be realized. Until now, prevention of overflow of the porous medium in the case of liquids driven from radially inward to radially outward has only been possible via structures that prevent flow around the porous medium through a physical barrier and thus represent a sealing apparatus. The present disclosure eliminates the need for a sealing apparatus. It is possible to precisely adjust the flow rate and thus the residence time of the analysis samples in the porous medium over a wide operating range.

Figure 3:
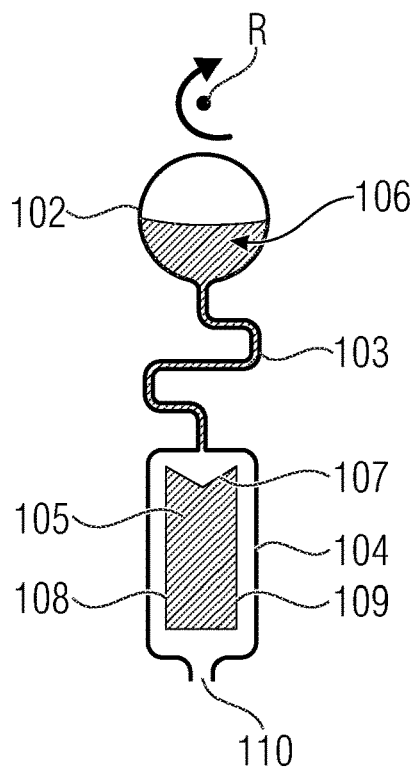
FIG. 3 is a schematic top view of an example of fluidic structures with a meandering flow resistance channel.

FIG. 3 shows a schematic top view of fluidic structures of a fluidic module rotatable about a center of rotation. The fluidic structures comprise a first fluid chamber 102, a flow resistance channel 103 and a second fluid chamber 104. In the example shown in FIG. 3, the flow resistance channel 103 is meander-shaped. A radially inner end of the flow resistance channel 103 opens into the first fluid chamber 102 that represents an inflow chamber, and a radially outer end of the flow resistance channel 103 opens into the second fluid chamber 104. A porous medium 105 is arranged in the second fluid chamber 104, which may be fixed to one side of a chamber wall of the second fluid chamber 104. On all other sides, the porous medium may be spaced apart from the chamber walls. Both fluid chambers 102 and 104 may be vented.

The flow resistance channel 103 is radially falling so that, upon rotation about the center of rotation, liquid 106 located in the first fluid chamber 102 can be driven through the flow resistance channel by centrifugal force. The liquid from the first fluid chamber is thereby driven centrifugally onto a radially inner portion of the porous medium 105. The liquid wetting the porous medium fills the porous medium and centrifugal pressure is created in the liquid in the porous medium. Above a critical filing level or completely filled, if needed, liquid would escape radially outwardly from the porous medium. In examples of the present disclosure, the fluidic resistance of the flow resistance channel 103 may thereby be configured such that, under rotation, the resulting flow rate from the first fluid chamber 102 into the second fluid chamber 104 results in the following condition: If the entire liquid flow coming from the flow resistance channel were to flow through the porous medium in a radially outward direction, a viscous pressure loss $p_{Darcy}$ results that is at most twice the hydrostatic pressure $p_{hyd,mem}$ of the liquid in the porous medium if the porous medium were filled with liquid along its entire radial length.

In yet another example of the present disclosure, the fluidic resistance of the flow resistance channel 103 may be configured such that, under rotation, the resulting flow rate from the first fluid chamber 102 into the second fluid chamber 104 results in the following condition: If the entire liquid flow coming from the flow resistance channel were to flow through the porous medium in a radially outward direction, a viscous pressure loss $p_{Darcy}$ results that is at most twice the hydrostatic pressure $p_{hyd,mem}$ of the liquid in any radially formed element of the porous medium, however small, if the element of the porous medium, however small, were filled with liquid along the entire radial length of the element, however small.

As shown in FIG. 3, the porous medium 105 may be provided with a notch 107 at the radially inner position to direct the liquid flow coming from the flow resistance channel 103 onto the porous medium under rotation. In other words, the notch assists in the absorption of the liquid by the porous medium and helps prevent the liquid from flowing directly along the porous medium. The notch edge rises toward the intersections with the two radially extending edges 108, 109 of the porous medium 105 in a radially inward direction.

After the liquid has flowed through the porous medium 105, it may exit the second fluid chamber 104 through an outlet 110.

Figure 4:
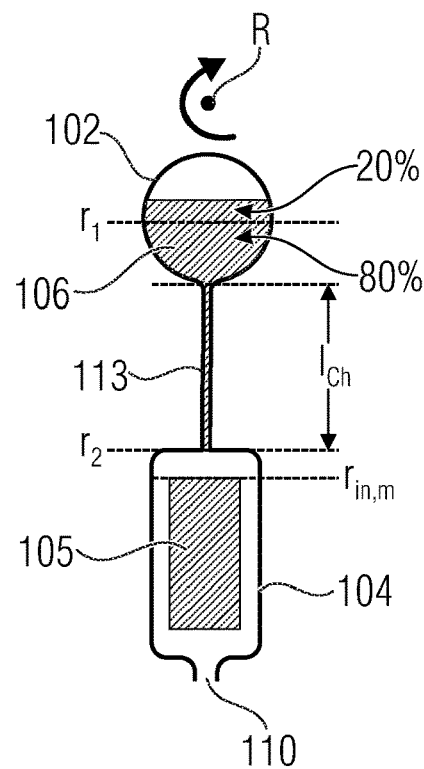
FIG. 4 is a schematic top view of an example of fluidic structures with a straight flow resistance channel.

FIG. 4 shows another example of fluidic structures of a fluidic module rotatable about a center of rotation R. According to FIG. 4, a straight, radially falling flow resistance channel 113 connects a first fluid chamber 102 and a second fluid chamber 104. In the second fluid chamber 104, a porous medium 105 is provided, the radially inner edge of which has no notch in this example. FIG. 4 further shows quantities that will be discussed below. These are the radial position $r_{in,m}$ of the radially inner end of the porous medium, the radial position $r_2$ of the mouth of the flow resistance channel 113 into the second fluid chamber 104 and thus the radially outer position of the liquid column, the length $l_{Ch}$ of the flow resistance channel 113 and a radial position $r_1$ corresponding to a radially inner position of the liquid column of the liquid 106 at 80% of an initial filling volume of the first fluid chamber 102. The initial filling volume may correspond to the volume with which the fluid chamber and the flow resistance channel are initially filled.

In examples of the present disclosure, when the fluidic module is rotated about the center of rotation R, flow of the liquid occurs through the porous medium integrated into the fluidic module, for example, the porous medium 105 in FIG. 4. The flow resistance channel 113 adjusts the flow rate from the first fluid chamber 102 to the second fluid chamber 104.

In order for the liquid to flow through the porous medium 105 and for the liquid to not flow around the porous medium 105 in the centrifugal gravity field (bypass), the fluidic structures has to follow the following condition:

$$\frac{r_2^2 - r_1^2}{c_R \frac{l_{Ch}}{A_{Ch}^2}} = 2 * D * r_{in,m} * A_m * \kappa \tag{1}$$

with $r_1$: radially inward position of the liquid column at 80% of the initial filling volume.

$r_2$: radially outward position of the liquid column $C_R$: geometry factor for calculating the fluidic resistance in the flow resistance channel.

$l_{Ch}$: length of the flow resistance channel $A_{Ch}$: cross-sectional area of the flow resistance channel D: design factor $r_{in,m}$: radial distance between center of rotation R and radial inner end of the porous medium $A_m$: cross-sectional area of the porous medium $\kappa$: permeability of the porous medium For example, the geometry factor $C_R$ is 28.4 for a square cross-section of the flow resistance channel and $8\pi$ for round channels, which roughly corresponds to 25.1. For rectangular resistance channels, $C_R$ is calculated as follows:

$$C_R = \frac{2}{a \sum_{i=1}^{\infty} \frac{a}{\alpha_i^5}\left(\frac{\alpha_i}{a} - \tanh\frac{\alpha_i}{a}\right)} \tag{2}$$

with $\alpha_i = \frac{\pi(2i-1)}{2}$ and $a = \frac{d}{w}$

Here, d represents the depth of the channel and w the width of the channel. Further geometry factors for special channel cross-sections can be found in the technical literature. In particular, reference should be made to M. Richter et al., "Microchannels for applications in liquid dosing and flow-rate measurement", Sensors and Actuators A: Physical, 1997, Vol. 62, Issue 1-3, Pages 480-483.

Equation (1) is derived from the following physical equations:

The equation for the centrifugal pressure $p_{cent}$ in the flow resistance channel:

$$p_{cent} = \frac{\rho}{2}\omega^2(r_2^2 - r_1^2) \tag{3}$$

with

ω: rotational speed

ρ: density of the fluid

The equation for the hydrostatic pressure in the liquid in the porous medium:

$$p_{hyd,m} = \frac{\rho}{2}\omega^2((r_{in,m}+l_m)^2 - r_{in,m}^2) \quad (4)$$

where $l_m$ is the length of the porous medium in the flow direction, i.e. is the radial length of the porous medium.

The equation for viscous dissipation in the flow resistance channel:

$$p_{visc} = Q_{Ch} C_R \frac{\eta l_{Ch}}{A_{Ch}^2} \quad (5)$$

with $Q_{Ch}$: flow rate through the flow resistance channel

η: viscosity of the liquid

The Darcy equation for viscous dissipation in a porous medium:

$$P_{Darcy} = Q \frac{\eta l_m}{\kappa A_m} \quad (6)$$

where Q is the flow rate through the porous medium.

A filled porous medium is assumed for the calculation. Thus, the capillary force does not need to be taken into account. The maximum bypass-free flow rate through the porous medium $Q_{max,m}$ is determined by equating the hydrostatic pressure in the liquid in the porous medium with the viscous dissipation due to the flow through the porous medium:

$$p_{hyd,m} = p_{Darcy} \quad (7)$$

Since the hydrostatic pressure in the liquid in the porous medium increases quadratically, while the pressure loss due to viscous dissipation increases linearly over the radial length of the porous medium, both equations are derived according to the radial length of the membrane $l_m$ and equated at the point $l_m=0$. This ensures that the centrifugal pressure is greater than or equal to the viscous dissipation over the entire length of the porous medium.

$$\frac{dp_{hyd,m}}{dl_m} = \frac{dp_{Darcy}}{dl_m}, \text{ with} \quad (8)$$

$$\frac{dp_{hyd,m}}{dl_m} = \rho(l_m + r_{in,m})\omega^2$$

$$\frac{dp_{Darcy}}{dl_m} = \frac{\eta * Q_{max,m}}{A_m * \kappa}$$

Solving equation (8) for $Q_{max,m}$, the maximum possible flow rate over the entire radial length of the porous medium can be calculated. The corresponding equation for the maximum possible flow through the porous medium is as follows:

$$Q_{max,m} = \frac{\rho * r_{in,m} * \omega^2 * A_m * \kappa}{\eta} \quad (9)$$

The flow rate obtained through the flow resistance channel is calculated as follows:

$$p_{cent} = p_{visc} \quad (10)$$

Inserting equation (3) and equation (5) into equation (10) and solving for the flow rate $Q_{Ch}$ in the channel results in:

$$Q_{Ch} = \frac{p_{cent}}{C_R \frac{\eta l_{Ch}}{A_{Ch}^2}} \quad (11)$$

To ensure complete flow through the porous medium, the following has to apply:

$$Q_{Ch} \leq Q_{max,m} \quad (12)$$

By equating the two flow rates $Q_{max,m}$ and $Q_{Ch}$, the transition point is defined. At the transition point, the centrifugal pressure of the liquid column in the porous medium is equal to the viscous dissipation in the porous medium, which occurs due to the flow rate specified by the connecting channel and a theoretically complete flow through the porous medium. Now, if the centrifugal pressure were smaller at a constant flow rate, flow around the porous medium would occur.

An additional, defined design factor D allows the flow rate to be adjusted later to meet specific fluidic module requirements:

$$Q_{Ch} = D * Q_{max,m} \quad (13)$$

By solving equation (13) for D, the following will be obtained:

$$D = \frac{Q_{Ch}}{Q_{max,m}} \quad (14)$$

In examples of the present disclosure, the fluidic structure is considered to be functioning when at least half of the liquid to be processed flows through the porous medium. As a result, a design factor D of less than or equal to two is selected.

Inserting equation (9) and equation (11) into equation (13) results in equation (1) above for the design of the structure.

Solving equation (1) for D and choosing the design factor to be less than or equal to two, results in:

$$D = \frac{r_2^2 - r_1^2}{2 * C_R \frac{l_{Ch}}{A_{Ch}^2} * r_{in,m} * A_m * \kappa} \leq 2 \quad (15)$$

Table 1 lists typical quantities for the operating range of a fluidic module designed according to equation (16).

| Property | Operating range | Unit |
| --- | --- | --- |
| Flow rates Q | 0.001 to 5 | µl/s |
| Permeability κ | 0.01 to 10 | µm$^2$ |
| Design factor D | 0 < D ≤ 2 | — |
| Viscosity | <300 | mPa · s |

Figure 5:
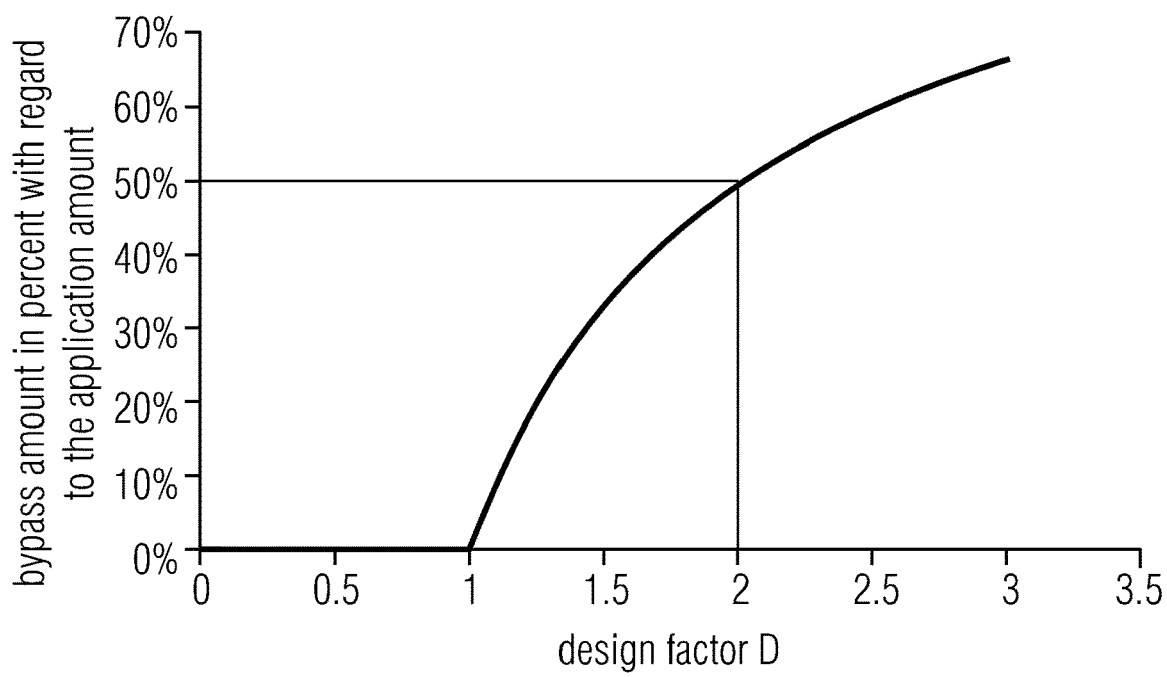
FIG. 5 is a diagram showing a bypass amount of liquid flowing past the porous medium as a function of a design factor D.

FIG. 5 shows the bypass amount with regard to the application amount, i.e. the amount of liquid supplied by the inflow structure, for design factors between 0 and 3.5. If the design factor D is greater than the critical design factor D=2, more than half of the application amount is lost as bypass above or next to the porous medium. In examples, the fluidic structure is therefore designed such that 50% or more of the application amount flows through the porous structure.

In the above calculations, the radial position $r_1$, which represents a filling level of 80% of an initial filling level, is used. For examples, instead of this filling level, a radial position $r_i$ can be used for the calculation, which corresponds to the radial position where the flow resistance channel opens into the first fluid chamber, i.e. the inflow chamber. If the above condition is fulfilled for the radial position $r_1$, it is in any case also fulfilled for the radial position $r_i$.

In examples, the fluidic structures may be designed such that a greater portion of the application amount flows through the porous medium. In examples, the design factor D can be selected to be less than or equal to 1.5. In examples, the design factor D may be selected to be less than or equal to 1 such that the entire application amount flows through the porous medium.

In examples, the fluidic module comprises a plurality of fluid chambers, each having a porous medium disposed therein, and an inflow structure associated with each fluid chamber so that liquid can be directed through several porous media simultaneously. The inflow structures may limit flows to equal flow rates, or may limit flows to different flow rates so that liquid passes through different porous media at different flow rates.

Figure 6:
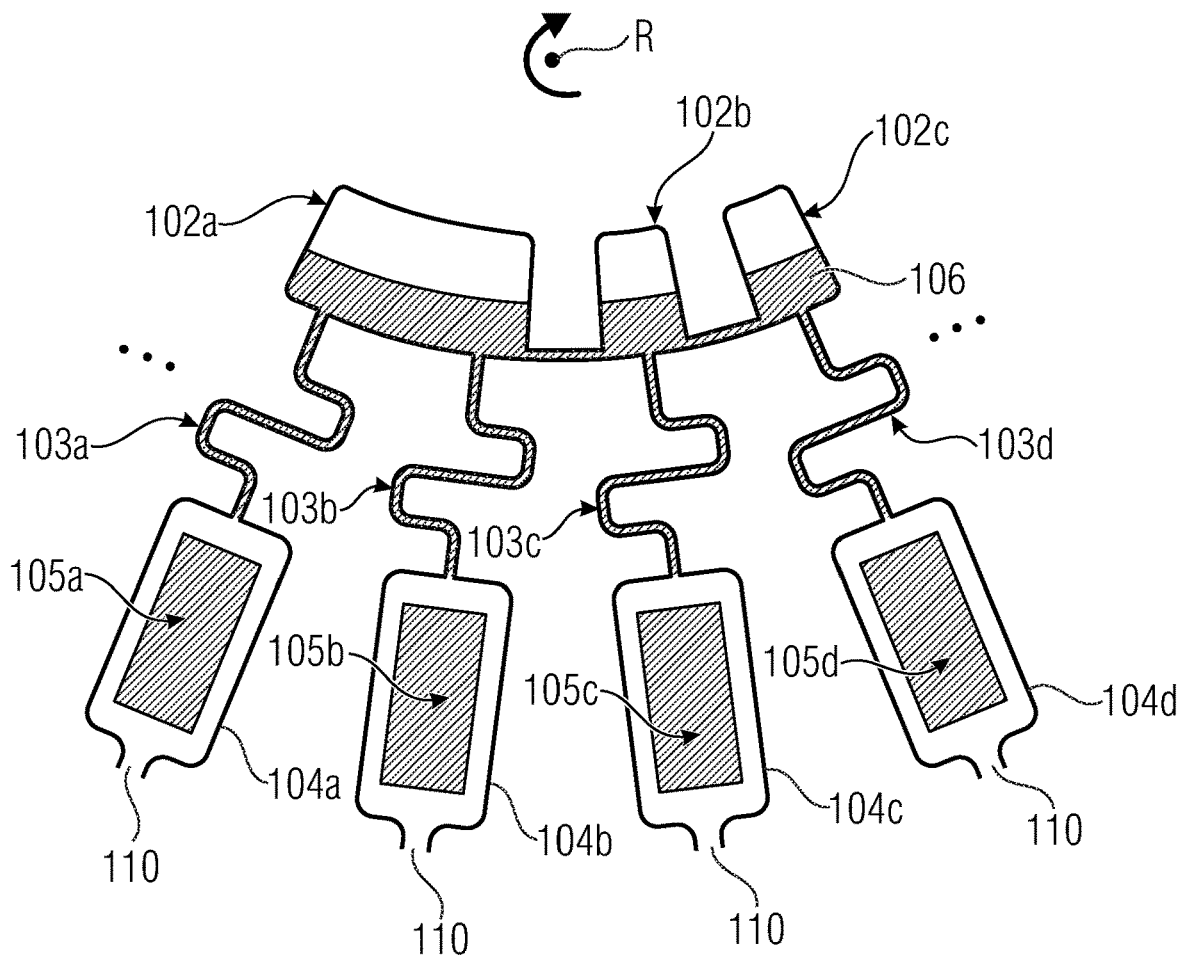
FIG. 6 is a schematic top view of an example of fluidic structures comprising several fluid chambers with allocated inflow structures.

In examples, fluidic structures of the fluidic module can thus be operated in parallel to integrate a porous medium. An example of such fluidic structures is shown in FIG. 6. A first fluid chamber may be configured as a radially inward fluid reservoir or as several interconnected radially inward fluid reservoirs 102a, 102b, 102c. The radially inward fluid reservoirs 102a, 102b, 102c may be connected via fluid channels that respectively interconnect radially outer portions of the fluid reservoirs. The fluid reservoir 102a is fluidically connected to one fluid chamber 104a of a plurality of second fluid chambers via a flow resistance channel 103a, and is fluidically connected to another fluid chamber 104b of the plurality of second fluid chambers via a flow resistance channel 103b. Each of the fluid reservoirs 102b and 102c is fluidically connected to an associated second fluid chamber 104c, 104d via a respective flow resistance channel 103c, 103d. A porous medium 105a to 105d is disposed in each of the second fluid chambers. Thus, by rotating the fluidic module in which the fluidic structures shown in FIG. 6 are formed, liquid can be driven in parallel through a plurality of porous media. In other examples, a different number of second fluid chambers may be connected to respective reservoirs. In other examples, non-fluidically connected reservoirs may be provided as first fluid chambers so that different liquids may be directed through the porous structures. The flow resistance channels may have the same or different flow resistances. If the flow resistance channels have different flow resistances, different flow rates can be realized in parallel at the same rotational frequency.

Figure 7:
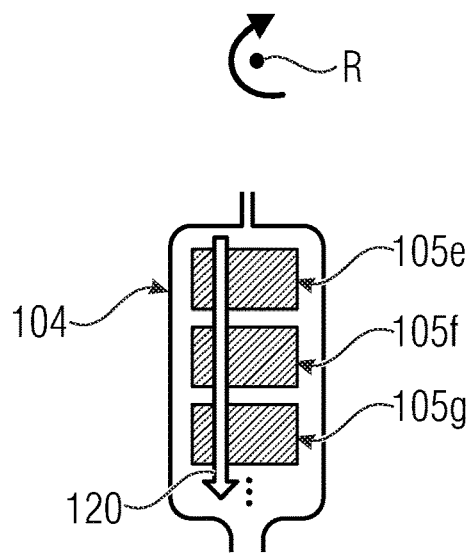
FIG. 7 is a schematic top view of an example of fluidic structures comprising several porous media arranged sequentially in a fluid chamber in the flow direction.

In examples, several porous media are arranged radially outward sequentially in the fluid chamber. One such example is shown in FIG. 7, where three porous media 105e, 105f, and 105g are arranged radially outward sequentially in a fluid chamber 102. It is obvious that in other examples, a different number of porous media could be arranged in the fluid chamber. Thus, any number of porous media 105e to 105g may be flowed through sequentially, as indicated by an arrow 120 in FIG. 7. This can prevent, for example, running dry of radially expanded porous media due to high centrifugal pressure.

Figure 8:
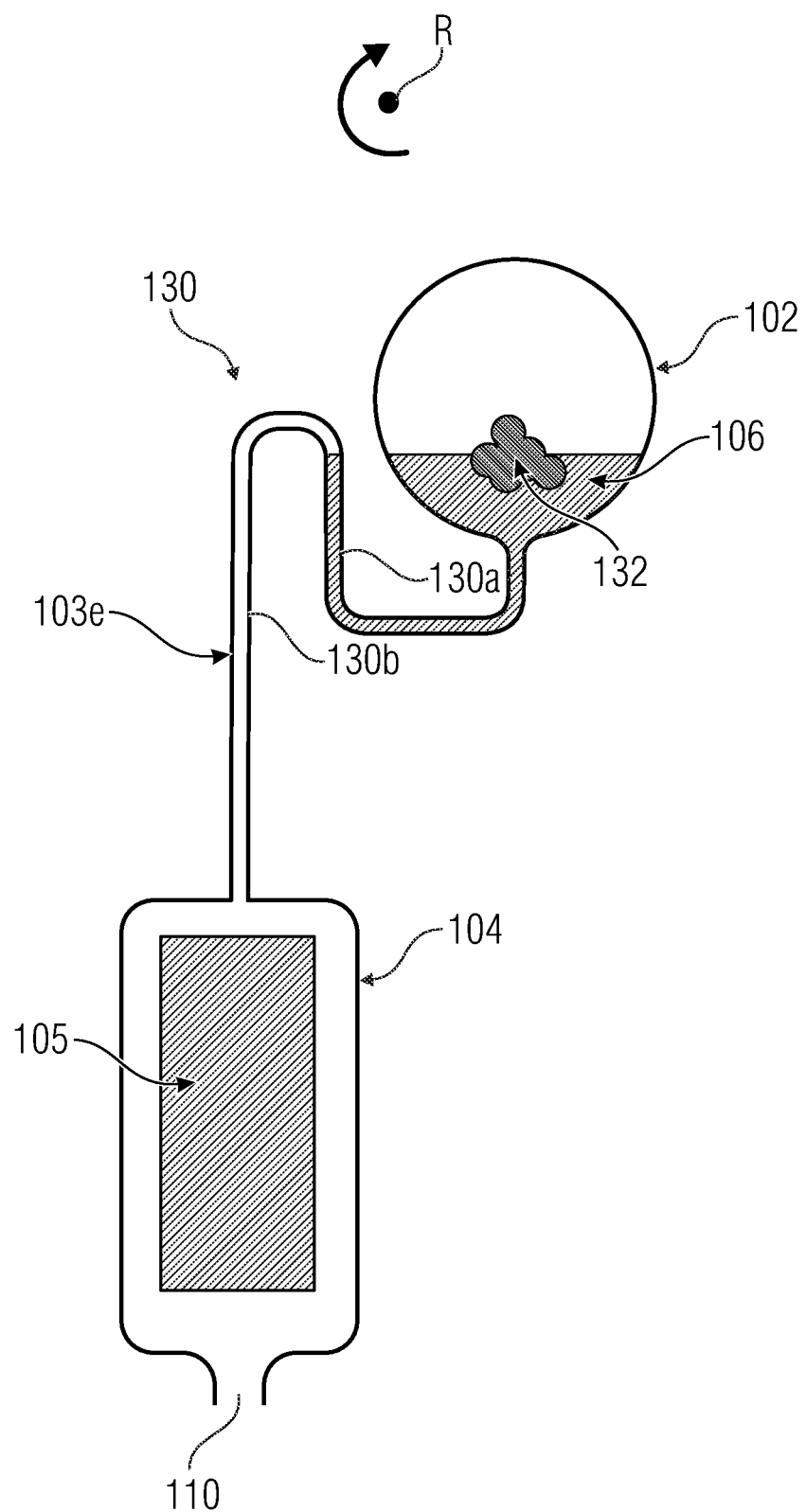
FIG. 8 is a schematic top view of an example of fluidic structures with an inflow structure comprising a siphon.

In examples, the inflow structure comprises a flow resistance channel having a siphon with a radially rising channel portion and a radially falling channel portion downstream of the radially rising channel portion. In such examples, the flow resistance channel may be used between a first fluid chamber and a second fluid chamber for passing on the liquid. For example, FIG. 8 shows fluidic structures in which a flow resistance channel 103e comprising a siphon 130 having a radially rising portion 130a and a radially falling portion 130b is fluidically connected between a first fluid chamber 102 and a second fluid chamber 104. A porous medium 105 is again disposed in the second fluid chamber 104. This allows, for example, additional reagents 132 to be mixed into the liquid 106 in the first chamber 102 and switch them on to the porous medium 105 after the mixing process. In the example shown, the switch is realized by the siphon 130. For example, the switch may be switched by changing a rotational frequency from a first rotational frequency to a second rotational frequency to turn on a flow of the liquid through the flow resistance channel 103e. In this regard, at the first rotational frequency, a centrifugal force acting on the liquid during a rotation about the center of rotation R may prevent liquid from being driven through the flow resistance channel 103e. The rotational frequency may then be reduced, at least temporarily, to a second rotational frequency at which the liquid is drawn in a capillary manner across the apex of the siphon 130, thereby turning on liquid flow through the flow resistance channel 103e. The capillary force in the flow resistance channel may additionally be adjusted by surface treatment to prevent premature switching of the siphon 130.

In examples, the fluidic module has an aliquoting structure that comprises a plurality of outputs. The aliquoting structure provides an aliquot of the liquid at each output. Each output of the aliquoting structure is fluidically coupled to a different one of a plurality of aliquot chambers. Each of a plurality of fluid chambers is fluidically coupled to a different aliquot chamber via an associated inflow structure.

Figure 9:
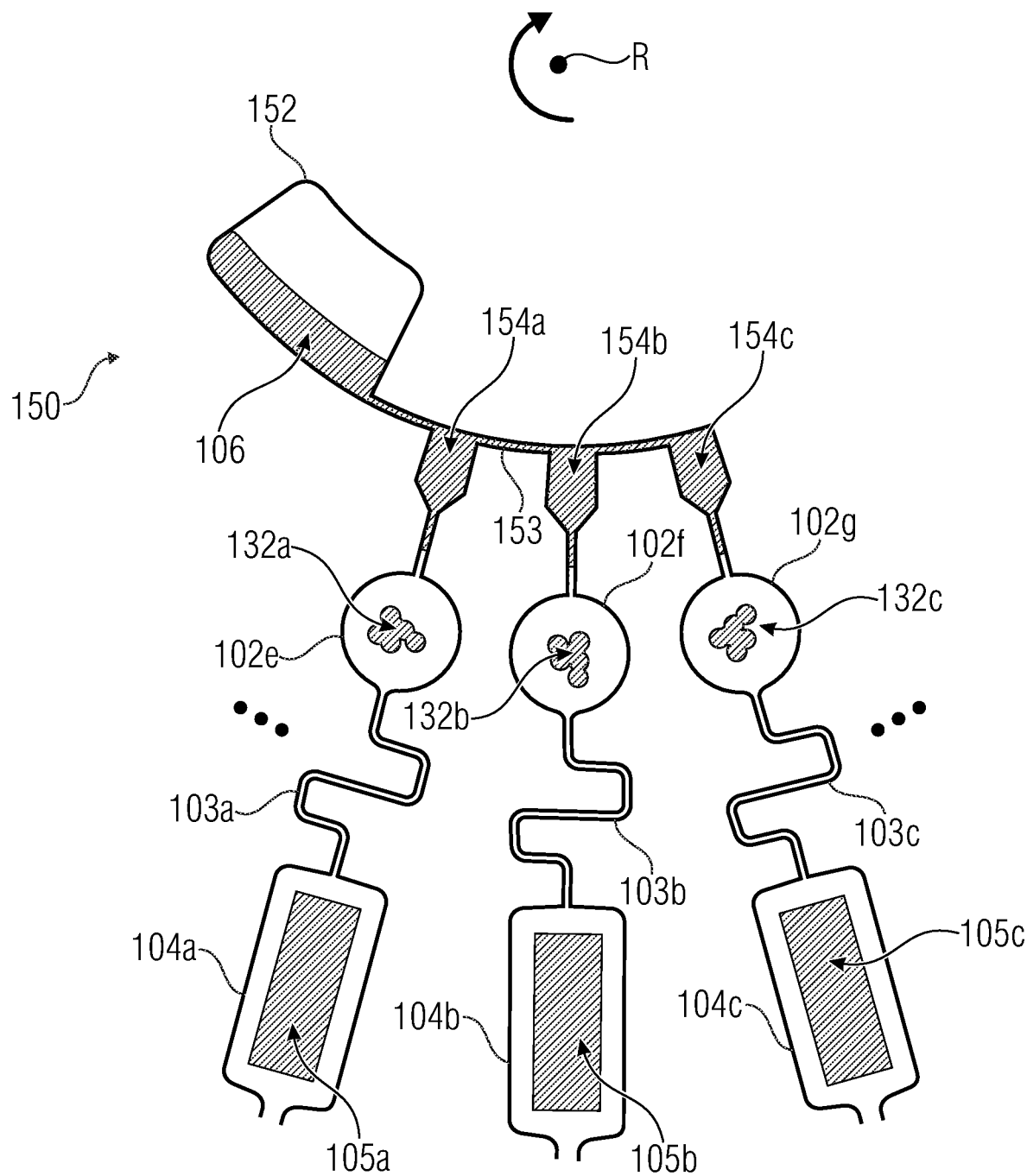
FIG. 9 is a schematic top view of an example of fluidic structures having a radially inner aliquoting structure.
Figure 10:
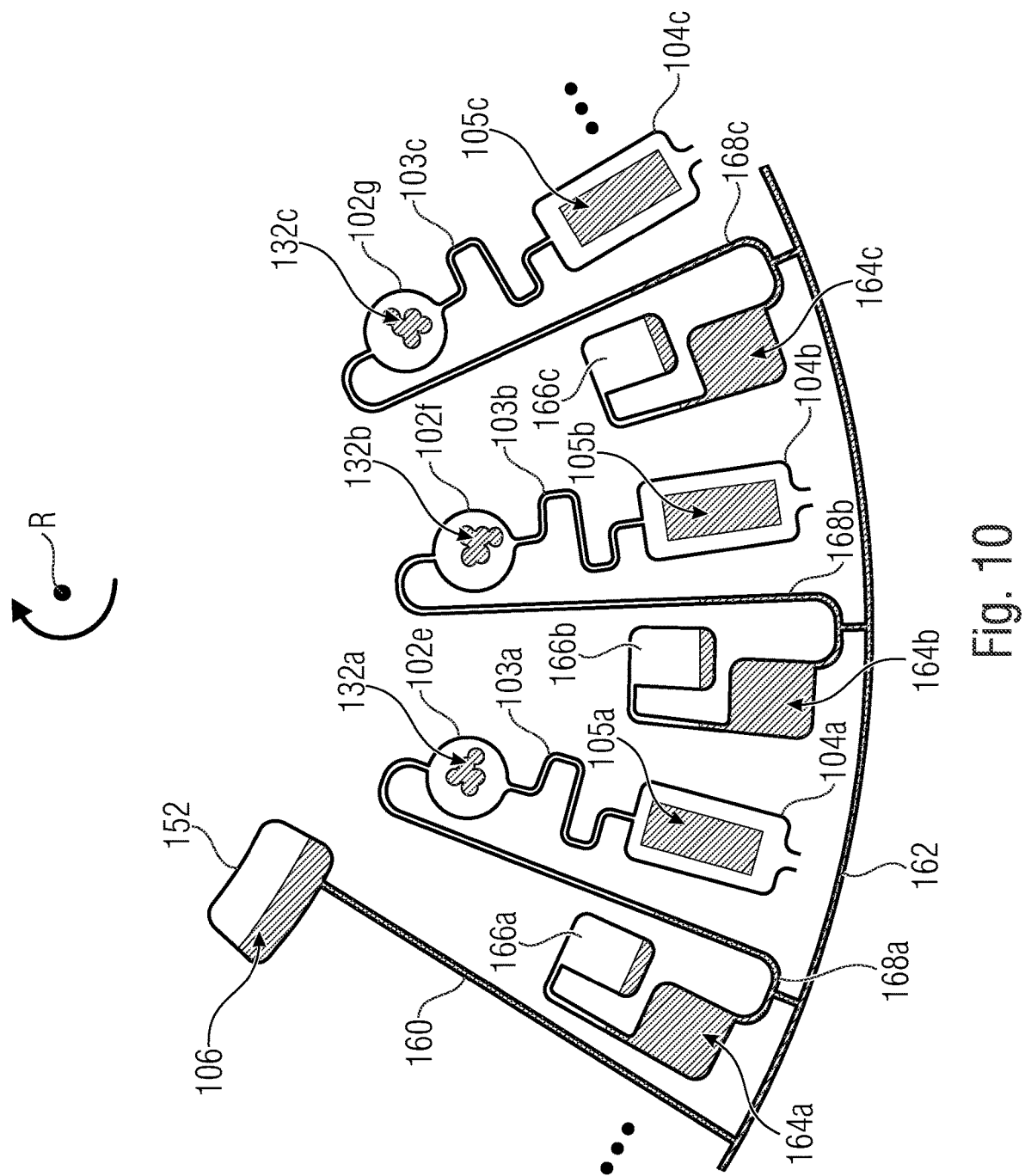
FIG. 10 is a schematic top view of an example of fluidic structures having a radially outer aliquoting structure.

FIGS. 9 and 10 show such examples. FIG. 9 shows an aliquoting structure 150 arranged radially inward, and FIG. 10 shows an aliquoting structure arranged radially outward.

As shown in FIG. 9, the aliquoting structure 150 includes an inlet chamber 152 fluidically connected to aliquoting chambers 154a, 154b, and 154c via an aliquoting channel 153. The aliquoting chambers 154a, 154b, and 154c serve to divide the liquid 106 into a plurality of aliquots. The aliquoting chambers 154a, 154b, and 154c are fluidically connected to aliquot chambers 102e, 102f and 102g via respective radially falling fluid channels. The aliquot chambers 102e, 102f and 102g represent first fluid chambers, each of which is coupled to a second fluid chamber 104a, 104b and 104c via an associated flow resistance channel 103a, 103b and 103. A porous medium 105a, 105b and 105c is disposed in each of the second fluid chambers 104a, 104b and 104c. The liquid can be centrifugally distributed from the inlet chamber to the aliquoting chambers 154a, 154b and 154c, where it can be mixed with different reagents 132a, 132b and 132c, and then driven through the respective porous medium 105a, 105b and 105c via the respective flow resistance channel 103a, 103b and 103c.

According to FIG. 10, the aliquoting structure and, in particular, an aliquoting channel of the aliquoting structure are arranged radially outward. An inlet chamber 152 is fluidically connected to a substantially azimuthally extending aliquoting channel 162 via a radially falling channel 160. Aliquoting chambers 164a, 164b and 164c are fluidically coupled to the aliquoting channel 162. Aliquoting chambers 164a, 164b and 164c are fluidically coupled to respective compression chambers 166a, 166b, 166c. Further, the aliquoting chambers 164a, 164b and 164c are fluidically connected to aliquoting chambers 102e, 102f and 102g via radially inward (rising) connecting channels 168a, 168b and 168c. By rotating the fluidic structures at an appropriate rotational frequency, liquid 106 can be caused to first be distributed into the aliquoting chambers 164a, 164b and 164c, compressing air in the compression chambers 166a, 166b and 166c. Excess liquid is also collected in compression chambers 166a, 166b and 166c, contributing to an additional increase in compression of the air in the compression chambers. Lowering the rotational frequency and/or other suitable measures, such as heating, can then be used to cause the air in the compression chambers to expand and drive the liquid through the connecting channels 168a, 168b and 168c into the aliquot chambers 102e, 102f and 102g. There, the fluid can again be mixed with different reagents 132a, 132b and 132c and then be driven through the respective porous media 105a, 105b and 105c via a respective flow resistance channel 103a, 103b and 103c.

In examples, the porous medium is fixed to a chamber wall of the fluid chamber and spaced apart from at least one other chamber wall of the fluid chamber so that a bypass path exists. In examples, the porous medium is fixed to a ceiling of the fluid chamber. In examples, the porous medium is fixed to a bottom of the fluid chamber. In examples, guiding structures are provided in the fluid chamber to guide the liquid to the radially inner portion of the porous medium. In examples, the guiding structure may comprise a notch at the transition from the inflow structure to the fluid chamber configured to guide the liquid to the radially inner portion of the porous medium using forces resulting from surface tension of the liquid to be guided.

Figure 11:
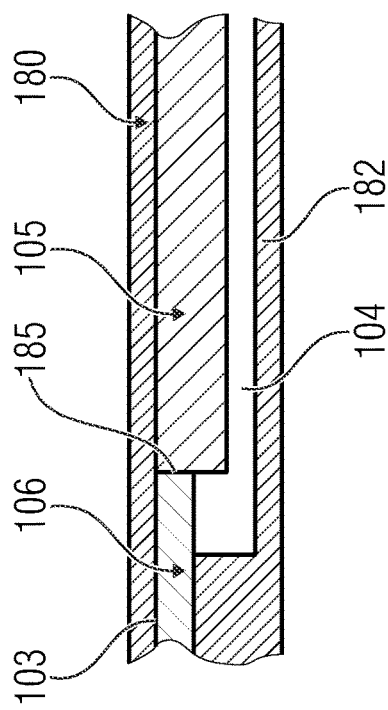
FIG. 11 is a schematic cross-sectional view of an example of fluidic structures with a porous medium disposed on a ceiling of a fluid chamber.

FIG. 11 shows a schematic cross-sectional view of an example of fluidic structures where a porous medium 105, such as a porous membrane, is fixed to a ceiling 180 of a fluid chamber 104. A flow resistance channel 103 has a lower depth than the fluid chamber 104 and opens into the fluid chamber 104 in the region facing the ceiling 180. The fluid chamber 104 and the channel 103 may be structured in a substrate starting from a first surface, the surface being provided with a lid forming the ceiling 180. The fluid chamber may be formed in the substrate to a first depth at which a bottom 182 of the fluid chamber is disposed. The fluid channel 103 may be formed to a lesser depth in the substrate. A liquid flow moves through the fluid channel 103 and along the ceiling 180 due to surface tension, and impinges on the radially inner portion 185 of the porous medium 105. As can be seen in FIG. 11, the porous material is spaced apart from the floor 182 so that a bypass path exists.

Figure 12A:
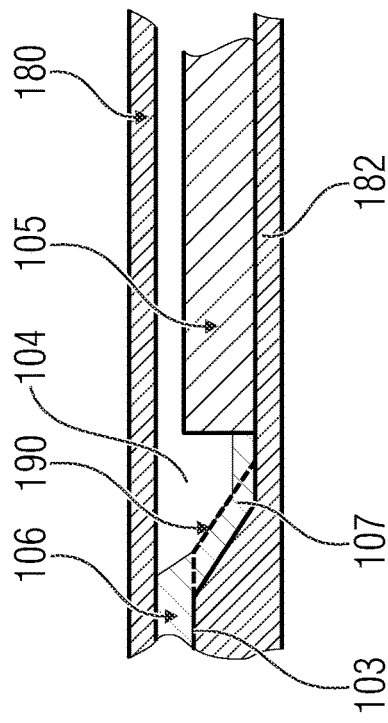
FIG. 12A is a schematic cross-sectional view of an example of fluidic structures with a porous medium disposed on a bottom of a fluid chamber.
Figure 12B:
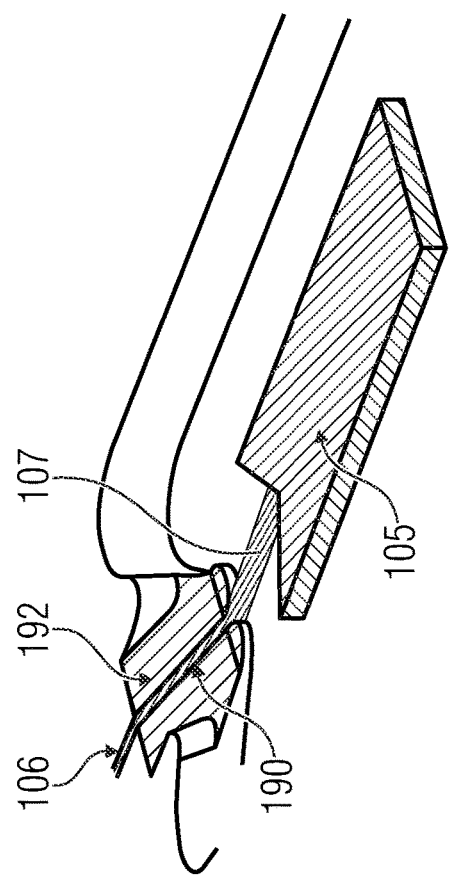
FIG. 12B is a schematic perspective view of the fluidic structures of FIG. 12A.
Figure 13A:
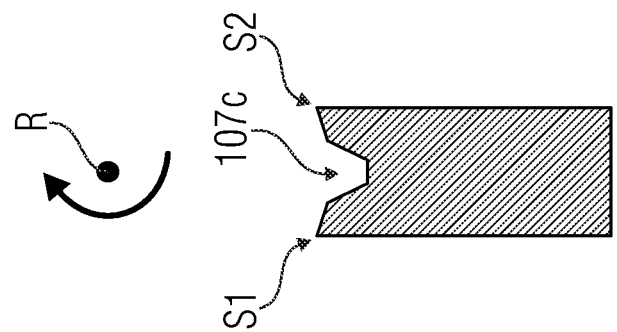
FIGS. 13A to 13D are schematic top views of examples of porous media.
Figure 13B:
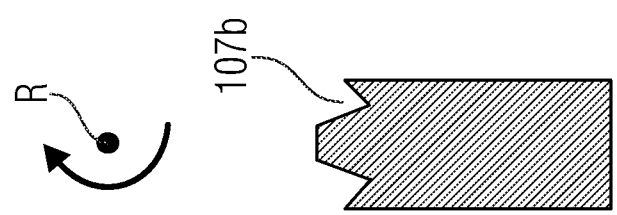
Figure 13C:
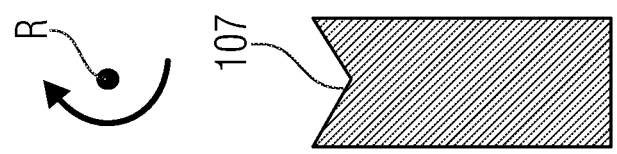
Figure 13D:
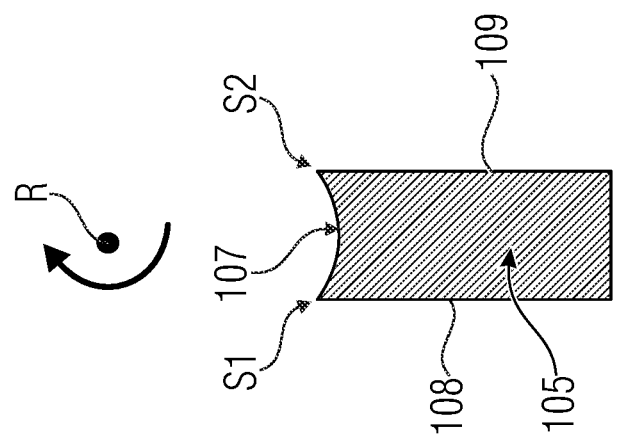

FIG. 12A shows a schematic cross-sectional view of an example of fluidic structures where a porous material is fixed to a bottom 182 of a fluid chamber 104. FIG. 12B shows a schematic perspective view of the fluidic structures of FIG. 12A. A guiding channel 190 for directing a flow 111 of liquid 106 on the chamber bottom 182 is provided, the guiding channel 190 being formed in a surface 192 extending obliquely to the chamber bottom. The guiding channel 192 is formed by a notch in the surface 192. The open channel 190 guides the liquid flow 111 from the flow resistance channel 103 onto the chamber bottom 182, and thus onto the porous medium 105.

It should be noted that in the microfluidic structures described, gravitational forces are negligible compared to capillary forces and centrifugal forces.

In examples, the radially inner edge of the porous medium has a notch with a notch edge that rises radially toward edges of the porous medium that are lateral with respect to the flow. The radially inner region of the porous medium, which is encountered by the liquid, is located between the lateral edges of the porous medium, towards which the notch edge rises radially. The radially inner notch of the porous medium for prevention of flow around the same can have different geometries in different examples. Four possible variants are shown in FIGS. 13A to 13D. In each case, the notch edge rises towards the intersection points S1, S2 with the two radially extending edges 108, 109 of the porous medium 105 in the radially inward direction. According to FIG. 13A, the notch 107 has a rounded shape with a radial maximum at the center of the notch. According to FIG. 13B, the notch has a triangular shape, also with a radial maximum at the center of the notch. According to FIG. 13C, the notch 107b has a radial minimum between two radial maxima. According to FIG. 13D, the notch 107c has discrete regions with different slopes starting from a radial maximum at the center of the notch to the intersection points S1, S2.

In examples of the present disclosure, the fluidic structures are configured such that the liquid flow from the inflow structure is centered or substantially centered on the radially inner portion of the porous medium. In examples, the fluidic structures are configured such that the fluid flow is centered or substantially centered on the notch. In examples, the inflow structure may be disposed radially inward of the radially inner portion of the porous medium and faces the same to direct the liquid flow toward that portion.

In examples of the present disclosure, the liquid directed through the porous medium contains a reaction mix for (bio)chemical interaction at the porous medium. For example, this reaction may be suitable for (bio)chemical reaction or for detection of biomolecules, such as gold nanoparticles or fluorescent particles with immobilized antibodies. Further, the liquid may contain an analyte to be detected. In addition, the porous medium may be impregnated with biomolecules, such as capture antibodies, to which substances from the liquid can bind.

In examples, the porous medium represents a solid phase for surface reactions, wherein the porous medium may be impregnated with a reactive component, such as biomolecules. In examples, the porous medium represents a solid phase for surface attachment reactions.

In examples, an optical readout system may be provided to read out the result of the reaction. For this purpose, parts of the fluidic module and the system may be transparent to allow optical readout through such parts. Additionally, in examples, temperature control means may be provided to adjust the temperature of the fluidic module in a controlled manner as needed during the entire process. This makes it possible, for example, to realize equal bonding rates of substances across fluidic modules.

Thus, in examples of the present disclosure, lateral movement of a liquid sample or a liquid reagent along a porous medium, which may also be referred to as a porous carrier matrix, is effected radially outwardly by applying a centrifugal force to the liquid sample by rotating the fluidic module. Thus, examples of the present disclosure enable preforming a lateral flow immunoassay. The porous medium may have an open pore structure with an average pore size in a range of 0.05 to 250 micrometers and a thickness in a range of 0.01 to 5 mm. The porous material may comprise an open-pore sintered material, open-pore polymer, open-pore ceramic material, open-pore polymeric foam, open-pore composite, natural or synthetic fiber, cross-linked bead fill, or nitrocellulose.

It has been found that examples of the present disclosure can reduce or eliminate numerous disadvantages encountered in the known systems described above that provide flow control through a porous medium, some of which are mentioned below. In known systems, the flow rate is dependent on the capillarity of the porous medium and thus the methods described therein are limited by the limited changeable properties of the porous medium. The maximum possible flow rate for a flow is limited radially inward by the capillary force, since the centrifugal force can only decelerate the flow and cannot accelerate the same. Highly viscous media, which are drawn very slowly through the porous medium, can therefore only be processed to a limited extent, as a flow rate acceleration is needed compared to purely capillary flow in order to shorten the time needed for the test in a user-friendly manner. The flow rate is dependent on the column of liquid that has already risen in the porous medium and is thus time-dependent at a constant rotational frequency. The liquid volume to be processed is limited by the absorption capacity of the porous medium. By introducing a so-called waste fiber web, the absorption capacity can be increased, but the fiber web needs additional space and the connection between the porous medium and the waste fiber web is an additional source of flow rate variations between the fluidic modules. The methods described in WO 2009/039239 A2 are disadvantageous because the liquid is applied directly to the porous test carrier and moved by subsequent application of a centrifugal force. As a result, the sample volume is severely limited by the liquid holding capacity of the porous medium, since continuous liquid application is not possible with the apparatus described. In the case of the flow direction radially outward, any residual liquid not yet absorbed would additionally be centrifuged off in an uncontrolled manner by the subsequent centrifugation. Thus, the amount of liquid is limited to the absorption capacity of the porous medium. This is disadvantageous, among other things, when larger amounts of liquid are to be applied, such as larger sample volumes or as occurs, for example, during washing. Further, the analysis sample is absorbed by the porous medium in an uncontrolled manner during application to the porous medium. For the described flow direction radially inward, the disadvantages indicated in this respect again apply. In US 2007/0054270 A1, the porous medium is a bead fill introduced into a reaction chamber. Seals are needed to retain the beads and to ensure complete flow. The smaller the diameter of the beads, the more advantageous the surface-to-volume ratio of the fill. However, at the same time, the manufacturing effort of the seals needed for retaining the smaller beads increases. Likewise, the storage of bead fill material is generally a technical challenge. Compared to fill materials in the macro world, bead fill materials for microfluidics are difficult to store in liquid form due to evaporation effects. Therefore, elaborate precautions have to be taken for drying bead fill materials to ensure the functionality of the bead surface, to prevent individual beads from entering channels or chambers not intended for this purpose during transport and storage, and to obtain a homogeneous fill material after reconstitution, namely a uniform distribution of the beads without the formation of cavities.

In contrast to the known techniques, by means of the described structures according to examples of the present disclosure in the field of centrifugal microfluidics, a capillary force-independent, totally controllable and complete (or depending on the choice of the design factor D at least more than 50 percent) flow through a porous medium can be achieved, provided that the liquid wets the porous medium. No sealing apparatus is needed to integrate the porous medium into the structure. The porous medium can be easily fixed to the ceiling or floor of a fluid chamber. The flow rate and thus the residence time of the analysis sample in the porous medium can be precisely adjusted via the design of the flow-limiting flow resistance channel and the rotational frequency, regardless of the manufacturing quality of the porous medium.

Thus, compared to a capillary-driven flow, the incubation time can not only be extended but also shortened. Thus, for the first time, the fluidic module of the present disclosure makes it possible to process larger sample volumes of a viscous sample in a controlled manner within a reasonable time frame. Dilution of the analysis sample to reduce viscosity may no longer be needed. This possibility is based in particular on three factors that represent general advantages over other systems:

- The fluidic path length through the porous medium remains constant after the initial filling of the porous medium with the liquid to be processed, since no further fiber webs, such as waste fiber webs, are needed and are therefore not provided.
- The fluidic path length through the porous medium has no influence on the flow rate and can therefore be chosen as short or long as desired.
- The driving force of the flow is merely the centrifugal force. Accordingly, by increasing the centrifugal pressure in the liquid in the porous medium, the viscous liquid can be processed with incubation times that would be comparable to those of low-viscosity liquids.

Further, examples of the present disclosure allow for viscosity variations between analysis samples to be compensated for by preceding viscosity measurement (internally in the disc or externally in the laboratory) with subsequent rotational frequency adjustment, resulting consistent incubation times across tests.

Examples of the present disclosure comprise means for detecting information about the viscosity of the liquid, wherein the apparatus is configured to adjust the rotational speed of the rotation depending on the detected information about the viscosity to adjust the flow rate through the inflow channel. According to the present disclosure, the structural design is independent of the fluid properties and the rotational frequency. However, this does not apply to the adjusting flow rate. The same depends on the fluid properties and the rotational frequency. For example, highly viscous fluids flow more slowly through the fluidic module than low-viscosity fluids at the same frequency. Therefore, viscosity variations of the liquid sample have an impact on the processing time needed and thus on the residence time of the biomolecules in the porous medium. If the viscosity is known, for example by experimental determination or measurement on the fluidic module, the rotational frequency can be adjusted to obtain a sample-independent flow rate, for example a flow rate of 0.05 µl/s independent of the viscosity. Thus, for example, the coefficient of variation of an assay can be significantly reduced.

In particular, assays that use a porous medium as a solid phase, such as lateral flow assays, can benefit from this. An increase in sensitivity can be expected, on the one hand, because the incubation time of low-viscosity analysis samples can be extended. This eliminates the need for reactants with fast reaction kinetics and significantly increases the choice of reaction partners that can be used. On the other hand, in contrast to known methods, the sample volume can be selected independently of the membrane size, since no waste fiber web is needed, and the sample volume is limited only by the design of the peripheral microfluidic structure. Further, viscous samples can be processed undiluted. Both advantages increase the probability that a low concentrated analyte in the sample will bind on the surface of the porous medium.

Also, examples of the present disclosure allow the liquid flow to be stopped for the first time by decelerating to a rotational frequency of 0 Hz, since the flow through the porous medium (the membrane) is not capillary driven. This allows realization of a continuous readout throughout the assay, which in turn can be used to increase the dynamic range of the assay, as high analyte concentrations could cause the assay to terminate prematurely.

Moreover, different liquids can be driven sequentially through the porous medium without additional effort. Thus, for example, washing steps can be carried out between or after the (bio-)chemical interactions on the porous medium.

Further, especially compared to a known immunochromatographic rapid test, reagents can be rehydrated under controlled conditions and in special mixing chambers, which increases the repeatability of the test compared to rehydration from a fiber web under continuous flow. Likewise, repeatability can be increased by eliminating additional fiber webs (sample, conjugate and waste fiber webs) and thus eliminating the interconnecting surfaces between components.

Similarly, compared to a lateral flow test strip, the entire sample volume can be forced over the porous medium, so that less sample volume overall, and therefore fewer reagents, are needed for the same result, since no liquid remains in a sample pad.

In addition, liquid in the porous medium can be mechanically dried easily at the end of the process, for example by centrifuging the same. In contrast to known processes, in which a capillary-driven flow is implemented in the radially inward direction, the membrane does not refill but remains unfilled, which provides a constant background for a possible subsequent optical evaluation and prevents possible subsequent reactions of the biomolecules on the porous medium.

Thus, examples of the present disclosure provide the following advantages:
- Fully controlled flow of a liquid wetting the porous medium through the porous medium in the radially outward direction with little or no bypass without the need for a sealing apparatus.
- The flow is decoupled from the material properties of the porous medium such as permeability and capillary force
- The flow rate through the porous medium is controlled only by the rotational frequency and the flow-limiting flow resistance channel. This allows the flow rate to be precisely adjusted to a constant level, which in turn allows accurate setting of incubation times
- The design of the fluidic module to avoid bypass flows around an integrated porous medium is independent of the viscosity and density of the liquid to be processed, as well as independent of the rotational frequency used
- The maximum sample volume is not limited by the absorption capacity of the porous medium and can be selected as desired, no additional porous media (sample, conjugate and waste pad) are needed
- The application of liquid to the porous medium can be stopped at any time, so that a selection of the porous medium can be carried out at standstill
- Different liquids can be driven sequentially through the porous medium without additional effort, for example to realize washing steps
- The porous medium can be dried mechanically (centrifuging), which results in a homogeneous background in an optical readout, and prevents subsequent reactions in the porous medium.

Examples of the present disclosure provide a fluidic module for centrifugal microfluidics, for filling, flowing through, and draining an integrated exposed porous medium with a liquid wetting the porous medium from radially inward to radially outward, consisting of at least one first chamber connected to at least one second chamber via at least one connecting channel. The second chamber includes at least one porous medium. The fluidic resistance of the connecting channel is configured such that, under centrifugation, the liquid flows through the porous medium, wherein, under rotation, the resulting flow rate from the first chamber to the second chamber leads to the following condition: If the entire flow of the flow resistance channel were to flow through the porous medium from radially inward to radially outward, a viscous pressure loss $p_{Darcy}$ would result that would be at most 2 times the hydrostatic pressure $p_{hyd,mem}$ of the liquid in the porous medium if the porous medium were filled with liquid along its entire radial length. In such a fluidic module, a guiding channel structure following the flow resistance channel can guide the liquid onto the porous medium. The porous medium may be notched at the radially inward position, with the notch edge rising toward the radially inward (direction of intersection) at the intersections with the two radially extending edges of the porous medium. The structure may be such that the connecting channel between the first and second chambers is configured as a siphon. An upstream viscosity measurement can be used to adjust the rotational frequency for processing the liquid. The liquid (aqueous phase) can represent a reaction mix for (bio)chemical interaction at the porous medium.

Examples of the present disclosure thus relate to fluidic modules, apparatuses and methods for driving liquids in a controlled manner through a porous medium in a radially outward direction. In this regard, the object is to ensure the flow of a liquid radially outward through a porous medium with minimal handling effort and to prevent or limit flow around the porous medium, thereby obtaining complete control of the flow rate through the porous medium. Continuous flow through a porous medium radially outward brings significant advantages, but has been considered an uncontrollable and bypassed integration concept, according to publications and expert statements.

The term liquid or liquid phase as used herein, as will be apparent to those skilled in the art, particularly includes liquids containing solid components, such as suspensions, biological samples and reagents.

Examples of the present disclosure may have particular application in the field of centrifugal microfluidics, which involves processing liquids in the femtoliter to milliliter range. Accordingly, the fluidic structures may have suitable dimensions in the micrometer range for handling corresponding volumes of fluid. In particular, examples of the disclosure may be applied in centrifugal microfluidic systems, such as those known as "lab-on-a-disc".

Generally, in examples of the disclosure, different flow resistances (fluidic resistances, hydraulic resistances) of respective fluid channels can be achieved via different flow cross-sections. In alternative examples, different flow resistances may also be achieved by other means, such as different channel lengths, obstacles integrated into the channels and the like. Where a comparison between flow resistances is indicated, the flow resistance to the same fluid shall be assumed in each case, unless otherwise indicated. Where reference is made herein to a fluid channel, this refers to a structure having a length dimension from a fluid inlet to a fluid outlet that is greater, for example more than 5 times or more than 10 times greater, than the dimension or dimensions defining the flow cross-section. Thus, a fluid channel may have a flow resistance to flow therethrough from the fluid inlet to the fluid outlet. In contrast, a fluid chamber herein is a chamber that may have dimensions such that no relevant flow resistance occurs therein.

Although some aspects of the present disclosure have been described as features in the context of an apparatus, it is obvious that such a description can also be considered as a description of corresponding process features. Although some aspects have been described as features in the context of a method, it is obvious that such a description can also be considered as a description of corresponding features of an apparatus or functionality of an apparatus.

In the preceding detailed description, various features have been grouped together in examples in part to streamline the disclosure. This type of disclosure should not be interpreted as an intent that the claimed examples have more features than are explicitly stated in each claim. Rather, as the following claims show, the subject matter may be found in fewer than all of the features of a single disclosed example. Consequently, the following claims are hereby incorporated into the detailed description, and each claim may stand as its own separate example. While each claim may stand as its own separate example, it should be noted that although dependent claims in the claims relate to a specific combination with one or more other claims, other examples also include a combination of dependent claims with the subject matter of any other dependent claim or a combination of any feature with other dependent or independent claims. Such combinations are said to be encompassed unless it is stated that a specific combination is not intended. It is further intended that a combination of features of a claim with any other independent claim is also encompassed, even if that claim is not directly dependent on the independent claim.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for directing a liquid through a porous medium, comprising:
   a fluidic module rotatable about a center of rotation and comprising a fluid chamber and an inflow structure,
   a porous medium disposed in the fluid chamber to allow centrifugal force-effected flow of the liquid impinging on a radially inner portion of the porous medium to a radially outer portion of the porous medium, wherein the porous medium is laterally at least partially spaced apart from chamber walls of the fluid chamber with respect to the flow, so that a fluid connection exists between the radially inner portion of the porous medium and the radially outer portion of the porous medium outside the porous medium, which represents a bypass for a liquid flow not through the porous medium between the chamber walls and the porous medium,
   wherein the inflow structure is configured to limit a centrifugal force-effected inflow of the liquid to the radially inner portion of the porous medium to a first flow rate,
   wherein a design factor D corresponding to a ratio of the first flow rate to a maximum possible flow rate through the porous medium is not greater than two,
   wherein the inflow structure comprises an inflow chamber and a flow resistance channel, the flow resistance channel connecting the inflow chamber to the fluid chamber, wherein the porous medium and the flow resistance channel are configured to satisfy the following equation:

$$D = \frac{r_2^2 - r_i^2}{2 * C_R \frac{l_{Ch}}{A_{Ch}^2} * r_{in,m} * A_m * \kappa}$$

wherein
D is a design factor,
$C_R$ is a geometry factor for calculating the fluidic resistance in the flow resistance channel, that depends on the cross section of the flow resistance channel, wherein the flow resistance channel cross section has a shape that remains the same during said flow,
$l_{ch}$ is the length of the flow resistance channel,
$A_{ch}$ is the cross-sectional area of the flow resistance channel,
$r_{in,m}$ is the radial distance between the radially inner portion of the porous medium and the center of rotation,
$A_m$ is the cross-sectional area of the porous medium perpendicular to the flow, and
κ is the permeability of the porous medium.

2. The apparatus according to claim 1, wherein the porous medium and the flow resistance channel are configured such that D≤1.5 or D≤1 applies.

3. The apparatus according to claim 1, wherein the flow resistance channel comprises a siphon with a radially rising channel portion and a radially falling channel portion downstream of the radially rising channel portion.

4. The apparatus according to claim 1, wherein the radially inner portion of the porous medium comprises a notch with a notch edge that rises radially towards edges of the porous medium that are lateral with respect to the flow.

5. The apparatus according to claim 1, wherein the porous medium is a solid phase for surface reactions, is a solid phase for surface attachment reactions, is impregnated with reactive components and/or is impregnated with biomolecules.

6. The apparatus according to claim 1, wherein several porous media are arranged radially outward sequentially in the fluid chamber.

7. The apparatus according to claim 1, wherein guiding structures are provided in the fluid chamber to guide the liquid to the radially inner portion of the porous medium.

8. The apparatus according to claim 7, wherein the guiding structure comprises a notch at the transition from the inflow structure to the fluid chamber that is configured to guide the liquid to the radially inner portion of the porous medium by means of forces resulting from the surface tension of the liquid to be guided.

9. The apparatus according to claim 1, wherein the fluidic module comprises a plurality of fluid chambers, each having a porous medium disposed therein, and a plurality of inflow structures, one associated with each fluid chamber, such that liquid can be directed simultaneously through several porous media, the inflow structures limiting the flows to equal or different flow rates.

10. The apparatus according to claim 9, wherein the fluidic module comprises:
   an aliquoting structure comprising a plurality of outputs configured to provide an aliquot of the liquid at each output, and
   a plurality of aliquot chambers, each fluidically coupled to an outlet of the aliquoting structure,
   wherein each of the fluid chambers is fluidically connected to a different one of the plurality of aliquot chambers via the associated inflow structure.

11. The apparatus according to claim 1, further comprising:
   a temperature controller configured to adjust the temperature of the fluidic module,
   a detector configured to detect a result of a reaction of the liquid with the porous medium.

12. The apparatus according to claim 1, comprising a drive configured to provide the fluidic module with the rotation.

13. The apparatus according to claim 12, further comprising a detector for detecting a flow rate through the inflow structure, the drive being configured to adjust the rotational speed of the rotation depending on the detected flow rate to adjust the flow rate through the inflow channel.

14. A method for directing a liquid through a porous medium, comprising:
   providing a fluidic module rotatable about a center of rotation, which comprises a fluid chamber and an inflow structure, wherein a porous medium is disposed in the fluid chamber to allow a centrifugal force-effected flow of the liquid impinging on a radially inner portion of the porous medium to a radially outer portion of the porous medium, wherein the porous medium is laterally at least partially spaced apart from chamber walls of the fluid chamber with respect to the flow, so that a fluidic connection exists between the radially inner portion of the porous medium and the radially outer portion of the porous medium outside the porous medium, which represents a bypass for a liquid flow not through the porous medium between the chamber walls and the porous medium, wherein the inflow structure is configured to limit centrifugal force-effected inflow of the liquid to the radially inner portion of the porous medium to a first flow rate, and wherein a design factor D corresponding to a ratio of the first flow rate to a maximum possible flow rate through the porous medium is not greater than two;
   introducing the liquid into the inflow structure; and
   rotating the fluidic module about the center of rotation to cause the inflow of the liquid through the inflow structure to the radially inner portion of the porous medium and to direct the liquid through the porous medium,
   wherein providing the fluidic module comprises providing a fluidic module, wherein the inflow structure comprises an inflow chamber and a flow resistance channel fluidically connecting the inflow chamber to the fluid chamber, the inflow chamber being filled with a liquid column corresponding to an initial liquid volume, wherein the porous medium and the flow resistance channel are configured to satisfy the following equation:

$$D = \frac{r_2^2 - r_i^2}{2 * C_R \frac{l_{Ch}}{A_{Ch}^2} * r_{in,m} * A_m * \kappa}$$

wherein
D is a design factor,
$C_R$ is a geometry factor for calculating the fluidic resistance in the flow resistance channel, that depends on the cross section of the flow resistance channel, wherein the flow resistance channel cross section has a shape that remains the same during said flow,
$I_{ch}$ is the length of the flow resistance channel,
$A_{ch}$ is the cross-sectional area of the flow resistance channel,
$r_{in,m}$ is the radial distance between the radially inner portion of the porous medium and the center of rotation,
$A_m$ is the cross-sectional area of the porous medium perpendicular to the flow, and
κ is the permeability of the porous medium.

15. The method according to claim 14, further comprising stopping the rotation of the fluidic module to stop the flow of the liquid through the porous medium.

16. The method according to claim 14, wherein the porous medium is a solid phase for surface reactions, a solid phase for surface attachment reactions, is impregnated with reactive components, and/or is impregnated with biomolecules.

17. The method according to claim 14, wherein the fluidic module comprises a plurality of fluid chambers, each having a porous medium disposed therein, and a plurality of inflow structures, one associated with each fluid chamber, the inflow structures limiting the flows to equal or different flow rates, the method comprising introducing liquid into each of the plurality of inflow structures such that rotating the fluidic module directs the liquid in parallel through the porous media.

18. The method according to claim 17, wherein the fluidic module comprises an aliquoting structure comprising a plurality of outputs configured to provide an aliquot of the liquid at each output, and a plurality of aliquot chambers, each fluidically coupled to an outlet of the aliquoting structure, wherein each of the fluid chambers is fluidically connected to a different one of the plurality of aliquot chambers via the associated inflow structure, the method comprising aliquoting the liquid into a plurality of aliquots using aliquoting structure, wherein rotating the fluidic module directs each aliquot through one of the inflow structures into the associated fluid chamber.

19. The method according to claim 14, comprising detecting a flow rate through the inflow structure and adjusting the rotational speed of the rotation depending on the detected flow rate to adjust the flow rate through the inflow channel.

* * * * *